(12) United States Patent
Zhang et al.

(10) Patent No.: US 11,924,834 B2
(45) Date of Patent: Mar. 5, 2024

(54) CONTROL CHANNEL MONITORING AND INFORMATION ELEMENT TRANSMISSION METHODS AND APPARATUSES, DEVICE AND STORAGE

(71) Applicant: ZTE Corporation, Guangdong (CN)

(72) Inventors: Shujuan Zhang, Guangdong (CN); Zhaohua Lu, Guangdong (CN); Chuangxin Jiang, Guangdong (CN); YuNgok Li, Guangdong (CN); Bo Gao, Guangdong (CN); Hao Wu, Guangdong (CN); Zhen He, Guangdong (CN)

(73) Assignee: ZTE Corporation, Shenzhen (CN)

( * ) Notice: Subject to any disclaimer, the term of this patent is extended or adjusted under 35 U.S.C. 154(b) by 476 days.

(21) Appl. No.: 17/290,730

(22) PCT Filed: Nov. 1, 2019

(86) PCT No.: PCT/CN2019/115089
§ 371 (c)(1),
(2) Date: Apr. 30, 2021

(87) PCT Pub. No.: WO2020/088663
PCT Pub. Date: May 7, 2020

(65) Prior Publication Data
US 2022/0007400 A1 Jan. 6, 2022

(30) Foreign Application Priority Data
Nov. 2, 2018 (CN) .......................... 201811302877.0

(51) Int. Cl.
*H04W 72/12* (2023.01)
*H04L 1/08* (2006.01)
(Continued)

(52) U.S. Cl.
CPC ............... *H04W 72/20* (2023.01); *H04L 1/08* (2013.01); *H04L 1/1614* (2013.01); *H04L 5/0048* (2013.01)

(58) Field of Classification Search
CPC ....... H04B 7/024; H04B 7/063; H04L 1/0061; H04L 1/0072; H04L 1/08; H04L 1/1614;
(Continued)

(56) References Cited

U.S. PATENT DOCUMENTS 9,379,827 B2 6/2016 Sun et al.
10,763,939 B2 9/2020 Zhou et al.
(Continued)

FOREIGN PATENT DOCUMENTS

CN 103684676 A 3/2014
CN 105637964 A 6/2016
(Continued)

OTHER PUBLICATIONS

International Search Report dated Feb. 3, 2020 in connection with International Application No. PCT/CN2019/115089.
(Continued)

*Primary Examiner* — Awet Haile
(74) *Attorney, Agent, or Firm* — Perkins Coie LLP

(57) ABSTRACT

Provided are a control channel monitoring method and apparatus, an information element transmission method and apparatus, a device, and a storage medium Whether H first-type control channel elements include the same control channel information can be determined according to signaling information and/or a preset rule, where H is a positive integer greater than or equal to 2; and a control channel is monitored according to a determination result.

21 Claims, 10 Drawing Sheets

(51) Int. Cl.
   *H04L 1/16*      (2023.01)
   *H04L 1/1607*    (2023.01)
   *H04L 5/00*      (2006.01)
   *H04W 72/20*     (2023.01)

(58) Field of Classification Search
   CPC ..... H04L 1/1819; H04L 1/1893; H04L 5/001; H04L 5/0023; H04L 5/0048; H04L 5/0053; H04L 5/0064; H04L 5/0091; H04W 72/20
   See application file for complete search history.

(56) References Cited

U.S. PATENT DOCUMENTS

| | | | |
|---|---|---|---|
| 11,228,415 B2* | 1/2022 | Yoo | H04L 5/0091 |
| 2015/0282122 A1 | 1/2015 | Kim | |
| 2015/0236801 A1* | 8/2015 | Sun | H04J 4/00 370/328 |
| 2020/0275379 A1* | 8/2020 | Sun | H04W 52/242 |
| 2021/0051692 A1* | 2/2021 | Chen | H04L 5/0023 |
| 2021/0091900 A1* | 3/2021 | Zhang | H04W 72/20 |
| 2022/0174698 A1* | 6/2022 | Liu | H04L 5/0091 |

FOREIGN PATENT DOCUMENTS

| | | |
|---|---|---|
| CN | 107046457 A | 8/2017 |
| CN | 107306147 A | 10/2017 |
| CN | 107734514 A | 2/2018 |
| CN | 108633007 A | 10/2018 |
| EP | 2813009 A1 | 12/2014 |
| EP | 2890024 A1 | 7/2015 |
| EP | 3876462 A1 | 9/2021 |
| WO | 2013119060 A1 | 8/2013 |
| WO | WO 2015/172364 A1 | 11/2015 |
| WO | WO 2018/082520 A1 | 5/2018 |
| WO | WO 2018/127109 A1 | 7/2018 |
| WO | WO 2018/143331 A1 | 8/2018 |
| WO | 2018171494 A1 | 9/2018 |

OTHER PUBLICATIONS

European Search Report for EP Patent Application No. 19880857.8, dated Nov. 18, 2022, 11 pages.
Samsung, "UE features," 3GPP TSG RAN WG1 Meeting #92bis, R1-1804388, Sanya, China, Apr. 16-20, 2018, 7 pages.
AU 2019372678, May 17, 2022, Examination Report.
IN 202127024480, Mar. 4, 2022, Examination Report.
Australian examination report issued in AU Patent Application No. 2019372678, dated May 10, 2023, 4 pages.
Australian Examination Report dated May 17, 2022, in connection with Australian Application No. 2019372678.
Indian Examination Report dated Mar. 4, 2022, in connection with Indian Application No. 202127024480.
[No Author Listed], Evaluation of PDCCH repetition for URLLC. Agenda item 7.2.3. 3GPP TSG RAN WG1 Meeting #92. R1-1804853. Inter Digital Inc. Apr. 16-20, 2018. 7 pages.
ZTE, "Remaining issues on beam management," 3GPP TSG RAN WG1 Meeting #93, R1-1805828, Busan, Korea, May 21-25, 2018, 7 pages.
ZTE, "Remaining issues on QCL," 3GPP TSG RAN WG1 Meeting #93, R1-1805836, Busan, Korea, May 21-25, 2018, 7 pages.
Chinese office action issued in CN Patent Application No. 202210879136.9, dated Sep. 29, 2023, 8 pages. English translation included.

* cited by examiner

CONTROL CHANNEL MONITORING AND INFORMATION ELEMENT TRANSMISSION METHODS AND APPARATUSES, DEVICE AND STORAGE

CROSS REFERENCES TO RELATED APPLICATIONS

This Application is a national stage filing under 35 U.S.C. § 371 of International Patent Application Serial No. PCT/CN2019/115089, filed Nov. 1, 2019, entitled "CONTROL CHANNEL DETECTION AND INFORMATION ELEMENT TRANSMISSION METHODS AND APPARATUSES, DEVICE AND STORAGE MEDIUM". Foreign priority benefits are claimed under 35 U.S.C. § 119(a)-(d) or 35 U.S.C. § 365(b) of Chinese application number 201811302877.0, filed Nov. 2, 2018. The entire contents of these applications are incorporated herein by reference in their entirety.

TECHNICAL FIELD

The present disclosure relates to the technical field of communications.

BACKGROUND

A transmission configuration of a physical downlink control channel (PDCCH) in New Radio (NR) is more flexible than that in Long-Term Evolution (LTE).

A control resource set (CORESET) and a control channel search space set are introduced in NR. The number of candidate control channels included in each search space of an aggregation level in aggregation levels of {1, 2, 4, 8, 16} respectively is further configured in the configuration information of one control channel search space set. Each search space corresponds to one aggregation level, and the number of candidate control channels included for one aggregation level may be one of values {0, 1, 2, 3, 4, 5, 6, 8}. One search space set is associated with one CORESET, at most three CORESETs can be configured in one component carrier (CC), and at most ten search space sets can be configured in one bandwidth part (BWP).

In the related art, when the PDCCH is sent using a beam, the PDCCH can only achieve partial coverage. Therefore, how to improve the robustness of the PDCCH is an urgent problem to be solved currently.

Similarly, in the related art, a physical downlink shared channel (PDSCH) is associated with only one quasi co-location reference signal set, that is, supports only a transmission using a single beam. Therefore, how to support a transmission of the PDSCH using multiple beams is also an urgent problem to be solved.

SUMMARY

According to an aspect of embodiments of the present disclosure, a control channel monitoring method is provided. The method includes: determining, according to signaling information and/or a preset rule, whether H first-type control channel elements include the same control channel information, where H is a positive integer greater than or equal to 2; and monitoring a control channel according to a determination result.

According to another aspect of the embodiments of the present disclosure, an information element transmission method is provided. The method includes: associating one information element with N sets of values of parameter(s) of a type, where N is a positive integer greater than or equal to 1; and transmitting or monitoring the information element or transmitting or monitoring information in the information element according to the parameter(s) of the type; where the information element is at least one of a channel, a signal, a control channel resource element, a data channel codeword, control channel information, or a signal port.

According to another aspect of the embodiments of the present disclosure, a control channel monitoring apparatus is provided. The apparatus includes a determination module and a monitoring module. The determination module is configured to determine, according to signaling information and/or a preset rule, whether H first-type control channel elements include same control channel information, where H is a positive integer greater than or equal to 2. The monitoring module is configured to monitor a control channel according to the determination result.

According to another aspect of the embodiments of the present disclosure, an information element transmission apparatus is provided. The apparatus includes a configuration module and a transmission module. The configuration module is configured to associate one information element with N sets of values of parameter(s) of a type, where N is a positive integer greater than or equal to 1. The transmission module is configured to transmit or monitor the information element or transmit or monitor information in the information element according to the parameter(s) of the type. The information element is at least one of a channel, a signal, a control channel resource element, a data channel codeword, control channel information, or a signal port.

According to another aspect of the embodiments of the present disclosure, a communication node device is provided. The communication node device includes a processor, a memory, and a communication bus. The communication bus is configured to implement a communication connection between the processor and the memory. The memory is configured to store one or more first computer-readable programs, and the processor is configured to execute the one or more first computer-readable programs to perform steps of the control channel monitoring method according to an embodiment of the present disclosure. Alternatively, the memory is configured to store one or more second computer-readable programs, and the processor is configured to execute the one or more second computer-readable programs to perform steps of the information element transmission method according to an embodiment of the present disclosure.

According to another aspect of the embodiments of the present disclosure, a computer-readable storage medium is provided. The computer-readable storage medium stores one or more first computer-readable programs which are executable by one or more processors to implement steps of the control channel monitoring method according to an embodiment of the present disclosure. Alternatively, the computer-readable storage medium stores one or more second computer-readable programs which are executable by one or more processors to implement steps of the information element transmission method according to an embodiment of the present disclosure.

According to the control channel monitoring method and apparatus, the information element transmission method and apparatus, the device, and the medium provided by the embodiments of the present disclosure, whether the H (H is greater than or equal to 2) first-type control channel elements include the same control channel information may be determined according to the signaling information and/or the preset rule, and then the control channel may be monitored according to the determination result so that the communication node device can repeatedly send the same control channel information through multiple candidate control channels, thereby increasing the robustness and transmission coverage distance of a PDCCH.

In addition, according to the control channel monitoring method and apparatus, the information element transmission method and apparatus, the device, and the medium provided by the embodiments of the present disclosure, one information element may be associated with the N sets of values of parameter(s) of a type so that the information element is transmitted or monitored or the information in the information element is transmitted or monitored according to the parameter(s) of the type. Therefore, the communication node device can repeatedly send the same control channel information through more than one candidate control channel, which can increase the robustness and transmission coverage distance of the PDCCH and reduce the complexity of blind monitoring and power consumption of a terminal. The embodiments of the present disclosure also provide a solution for a transmission of a downlink signal using multiple beams.

DETAILED DESCRIPTION

In order for the object, solution and advantages of the present disclosure to be more apparent, embodiments of the present disclosure are further described below in detail in conjunction with implementations and drawings. It is to be understood that the embodiments described herein are merely intended to explain the present disclosure and not to limit the present disclosure.

Figure 1:
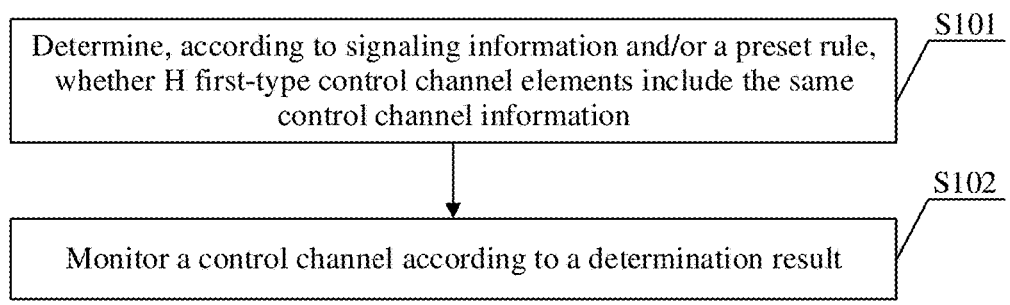
FIG. 1 is a flowchart of a control channel monitoring method according to an embodiment of the present disclosure.

An embodiment of the present disclosure provides a control channel monitoring method. As shown in FIG. 1, the method may include steps S101 and S102.

In step S101, whether H first-type control channel elements include the same control channel information is determined according to signaling information and/or a preset rule, where H is a positive integer greater than or equal to 2.

According to the embodiment of the present disclosure, whether the H first-type control channel elements include the same control channel information is determined according to the signaling information, or whether the H first-type control channel elements include the same control channel information is determined according to the preset rule, or whether the H first-type control channel elements include the same control channel information is determined according to the signaling information in conjunction with the preset rule, which may be flexibly performed according to specific application requirements. Moreover, in the embodiment of the present disclosure, a specific value of H, that is, the number of the first-type control channel elements, may also be flexibly determined.

For example, in an example embodiment, the value of H may be associated with information about an information format of the control channel information. However, it is to be understood that the value of H may be associated with the information about the information format of the control channel information, which is not limited thereto.

According to an embodiment of the present disclosure, the signaling information may be signaling information exchanged between communication node devices, and the preset rule may be a preset rule that may be predetermined or otherwise configured between the communication node devices.

In step S102, a control channel is monitored according to a determination result.

According to an embodiment of the present disclosure, when the determination result is that the same control channel information is included, the communication node device (which includes, but is not limited to, a terminal) may perform soft combining on two first-type control channel elements. According to an embodiment of the present disclosure, when the determination result is that transmitted control channels after channel encoding have the same bits, the communication node device may also perform combining before demodulation, thereby reducing the monitoring complexity of the communication node device.

According to an embodiment of the present disclosure, when the determination result is that different control channel information is included, the communication node device may monitor the first-type control channel elements separately and perform channel decoding a corresponding number of times.

Figure 2:
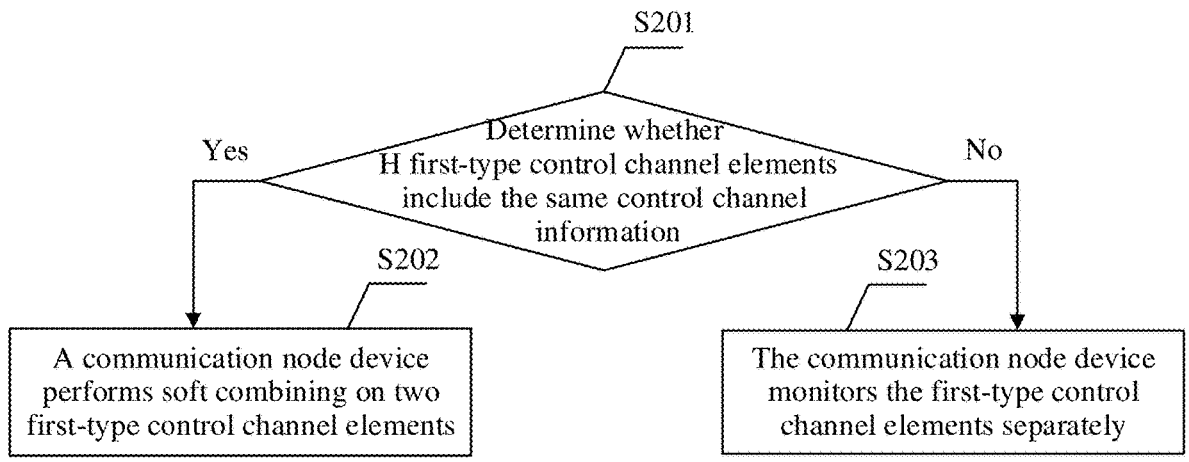
FIG. 2 is a flowchart in which a communication node performs a control channel monitoring method according to an embodiment of the present disclosure.

As shown in FIG. 2, which is another flowchart of the control channel monitoring method according to the embodiment of the present disclosure, the method may include steps S201 to S203.

In step S201, the communication node device determines, according to the signaling information and/or the preset rule, whether the H first-type control channel elements include the same control channel information. If so, S202 is performed; otherwise, S203 is performed.

In step S202, the communication node device performs soft combining on two first-type control channel elements.

In step S203, the communication node device monitors the first-type control channel elements separately.

According to an embodiment of the present disclosure, the step in which whether the H first-type control channel elements include the same control channel information is determined according to the signaling information and/or the preset rule satisfies at least one of characteristics described below, which is not limited thereto. In the case where a first-type parameter(s) of the H first-type control channel elements satisfies a first-type preset condition, the H first-type control channel elements include the same control channel information. In the case where the H first-type control channel elements include the same control channel information, a configuration of parameter(s) of a second type of C second-type control channel elements where the H first-type control channel elements are located satisfies a second-type preset condition. In the case where the H first-type control channel elements include the same control channel information, a configuration of parameter(s) of a third type of the H first-type control channel elements satisfies a third-type preset condition. H1 fourth-type control channel elements are configured in one third-type control channel element, and first-type control channel elements belonging to different fourth-type control channel elements in the one third control channel element include the same control channel information. First-type control channel elements belonging to different fourth-type control channel elements in a group of fourth-type control channel elements include the same control channel information. Alternatively, H3 sets of first information are activated for a control channel demodulation reference signal port, and first-type control channel elements belonging to different sets of first information include the same control channel information, where H3 is a positive integer greater than or equal to 2. C is a positive integer greater than or equal to 1, and resources where the first-type control channel elements are located belong to one or more second-type control channel elements.

According to an embodiment of the present disclosure, in the case where the H first-type control channel elements include the same control channel information, the H first-type control channel elements may satisfy at least one of characteristics described below, which is not limited thereto. The H first-type control channel elements belong to the H1 fourth-type control channel elements. A correspondence exists between fifth-type control channel elements included in the H first-type control channel elements. Demodulation reference signals of at least two of the H first-type control channel elements do not satisfy a quasi co-location relationship with respect to one type of quasi co-location parameters. A minimum value of the number of quasi co-location reference signal sets in a set composed of quasi co-location reference signal sets of all of the H first-type control channel elements exceeds a predetermined threshold of the number of sets. The number of different sequences of the H first-type control channel elements does not exceed a predetermined threshold of the number of sequences, where each of the different sequences includes at least one of a scrambling sequence of bits of a control channel after channel encoding, a demodulation reference signal sequence of a control channel, or a scrambling sequence of a cyclic redundancy check (CRC) bit for channel encoding of a control channel. Demodulation reference signals of the H first-type control channel elements have the same quasi co-location reference signal with respect to a spatial receive filtering parameter. Group information associated with quasi co-location reference signals of demodulation reference signals of the H first-type control channel elements with respect to a spatial receive filtering parameter satisfies a preset group information condition. A maximum interval between resources occupied by the H first-type control channel elements does not exceed a preset first interval threshold. A maximum interval between resources occupied by different first-type control channel elements of the H first-type control channel elements does not exceed a preset second interval threshold. Alternatively, the number of frequency domain bandwidths in a frequency domain bandwidth set composed of frequency domain bandwidths where the H first-type control channel elements are located does not exceed a preset threshold of the number of bandwidths. Each of the resources includes a time domain resource and/or a frequency domain resource. H1 is a positive integer greater than or equal to 1 and/or H is an integer multiple of H1. Each of the first-type control channel elements includes one or more fifth-type control channel resources.

According to an embodiment of the present disclosure, in the case where the H first-type control channel elements include the same control channel information, the H first-type control channel elements satisfy at least one of characteristics described below, which is not limited thereto. The H first-type control channel elements belong to the H1 fourth-type control channel elements. In the case where the first-type control channel elements are candidate control channels, the number of times blind monitoring corresponding to the H candidate control channels is performed is not equal to a value of H. A correspondence exists between fifth-type control channel elements included in two of the H first-type control channel elements. The demodulation reference signals of at least two of the H first-type control channel elements do not satisfy the quasi co-location relationship with respect to the one type of quasi co-location parameters. A minimum value of the number of different quasi co-location reference signal sets in the set composed of the quasi co-location reference signal sets of all of the H first-type control channel elements exceeds a first predetermined value. The number of different sequences of the H first-type control channel elements does not exceed a second predetermined value, where each of the different sequences includes at least one of the scrambling sequence of the bits of the control channel after channel encoding, the demodulation reference signal sequence of the control channel, or the scrambling sequence of the cyclic redundancy check (CRC) bit for channel encoding of the control channel. The demodulation reference signals of the H first-type control channel elements have the same quasi co-location reference signal with respect to the spatial receive filtering parameter. The group information associated with the quasi co-location reference signals of the demodulation reference signals of the H first-type control channel elements with respect to the spatial receive filtering parameter satisfies the preset group information condition. The maximum interval between the resources occupied by the H first-type control channel elements does not exceed a preset third predetermined value. The maximum interval between the resources occupied by the different first-type control channel elements of the H first-type control channel elements does not exceed a preset fourth predetermined value. The number of frequency domain bandwidths in the frequency domain bandwidth set composed of the frequency domain bandwidths where the H first-type control channel elements are located does not exceed a fifth predetermined value. Alternatively, the value of H is associated with the information about the information format of the control channel information. Each of the resources includes the time domain resource and/or the frequency domain resource. H1 is a positive integer greater than or equal to 1 and/or H is an integer multiple of H1. Each of the first-type control channel elements includes one or more fifth-type control channel resources.

According to an embodiment of the present disclosure, the fourth-type control channel elements satisfy at least one of characteristics described below, which is not limited thereto. The H1 fourth-type control channel elements are associated with an index of one third control channel element. The H1 fourth-type control channel elements belong to one or more groups of fourth-type control channel elements. Frequency domain bandwidths where at least two of the H1 fourth-type control channel elements are located have different indexes, where each of the frequency domain bandwidths includes a frequency domain bandwidth corresponding to a component carrier and/or a frequency domain bandwidth corresponding to a bandwidth part. Each of the H1 fourth-type control channel elements includes one or more of the H first-type control channel elements. The H first-type control channel elements are allocated in the H1 fourth control channel elements according to a preset proportion. Each of the H1 fourth-type control channel elements is associated with one quasi co-location reference signal set. Channels and/or signals in one of the fourth-type control channel elements satisfy a quasi co-location relationship. Channels and/or signals in at least two of the H1 fourth-type control channel elements do not satisfy a quasi co-location relationship with respect to one type of quasi co-location parameters. parameter(s) of a second type of the H1 fourth-type control channel elements satisfies the second-type preset condition. A maximum interval between resources occupied by the H1 fourth-type control channel elements does not exceed a preset sixth predetermined value. A maximum interval between resources occupied by different fourth-type control channel elements of the H1 fourth-type control channel elements does not exceed a preset seventh predetermined value. A resource where one of the first-type control channel elements is located is unable to belong to more than one fourth-type control channel element. Resources included in one precoding resource group are unable to belong to more than one fourth-type control channel element. The number of times blind monitoring of a control channel corresponding to the H1 fourth-type control channel elements is performed is different from the number of candidate control channels included in the H1 fourth-type control channel elements. In the case where the fourth-type control channel elements are quasi co-location resource groups, one of the quasi co-location resource groups includes an integer multiple of consecutive frequency domain groups in frequency domain, or resources included in the one of the quasi co-location resource groups in frequency domain do not belong to more than one consecutive frequency domain group, where one consecutive frequency domain group is one consecutive resource block group included in a control resource set where the one of the quasi co-location resource groups is located. Alternatively, each of the fourth-type control channel elements includes one of: one control channel search space, one control channel search space set, one time domain occasion of one control channel search space set, one time domain occasion of one control channel search space, one control resource set, one candidate control channel, one piece of transmission configuration information (TCI), one control channel quasi co-location resource group, or one control channel demodulation reference signal group.

According to an embodiment of the present disclosure, specific values of the above predetermined values may be flexibly set. For example, in an example embodiment, at least one of the first predetermined value, the second predetermined value, the third predetermined value, the fourth predetermined value, the fifth predetermined value, the sixth predetermined value, or the seventh predetermined value is obtained according to the signaling information and/or capability information reported by a communication node or in other manners. The communication node is a communication node that monitors the first-type control channel elements.

According to an embodiment of the present disclosure, the first information may, without limitation, be used for indicating at least one of the following information: a quasi co-location reference signal set; a phase tracking reference signal; a scrambling sequence generation parameter of bits of control channel information after channel encoding; a scrambling sequence generation parameter of a cyclic redundancy check bit for channel encoding of control channel information; or a sequence generation parameter of a demodulation reference signal of a control channel.

According to an embodiment of the present disclosure, the one third-type control channel element does, without limitation, satisfy at least one of the following characteristics: one control channel search space set, one control channel search space, one time domain occasion of one control channel search space set, or one time domain occasion of one control channel search space.

According to an embodiment of the present disclosure, the first-type parameter and/or the third-type of parameter may include, but are not limited to, at least one of the following parameters: indexes of the first-type control channel elements; indexes of the second-type control channel elements where the first-type control channel elements are located; a minimum index among indexes of the second-type control channel elements where the first-type control channel elements are located; a quasi co-location reference signal set of the first-type control channel elements; a resource mapping manner of the second-type control channel elements where the first-type control channel elements are located, where the resource mapping manner includes one or more of a mapping manner from control channel elements (CCEs) to resource element groups (REGs) or a mapping manner from first-type control channel elements to CCEs; time domain resources of the first-type control channel elements; frequency domain resources of the first-type control channel elements; the number of fifth-type control channel elements included in each of the first-type control channel elements, where each of the first-type control channel elements includes one or more fifth-type control channel elements; a sequence generation parameter of the first-type control channel elements, where a sequence includes at least one of the scrambling sequence of the bits of the control channel after channel encoding, the demodulation reference signal sequence of the control channel, or the scrambling sequence of the CRC bit for channel encoding of the control channel; a demodulation reference signal of the first-type control channel elements; an aggregation level of the first-type control channel elements; group information of the first-type control channel elements; or an index of a serving cell of the first-type control channel elements. In an example, the index of the serving cell may be used for a mapping from first-type control channel elements to CCEs, or the index of the serving cell is included in one piece of control channel information. The resources where the first-type control channel elements are located belong to one or more second-type control channel elements.

According to an embodiment of the present disclosure, the group information satisfies one of characteristics described below, which is not limited thereto. The group information is information about a group to which the second-type control channel elements where the first-type control channel elements are located belong, where one group includes one or more second-type control channel elements, and one second-type control channel element includes one or more first-type control channel elements. The group information is information about a group to which the first-type control channel elements belong, where one group includes one or more first-type control channel elements. In the case where two first-type control channel elements have the same group information, the two first-type control channel elements include the same control channel information. Alternatively, in the case where two first-type control channel elements have different group information, the two first-type control channel elements include different control channel information.

According to an embodiment of the present disclosure, the group information may also satisfy at least one of characteristics described below, which is not limited thereto. In the case where two first-type control channel elements have the same group information, the two first-type control channel elements include different control channel information. Alternatively, in the case where two first-type control channel elements have different group information, the two first-type control channel elements include the same control channel information.

According to an embodiment of the present disclosure, the above two first-type control channel elements may be any two of the H first-type control channel elements.

According to an embodiment of the present disclosure, the second-type parameter includes at least one of the following parameters of the second-type control channel elements: a time domain resource; a frequency domain resource; a resource mapping manner from CCEs to first-type control channel elements; a mapping manner from CCEs to precoding resource groups; a mapping manner from first-type control channel elements to CCEs; a parameter of a precoding resource group; information about a demodulation reference signal; configuration information of a quasi co-location reference signal set; a sequence generation parameter of a control channel in the control channel elements, where a sequence includes at least one of: the scrambling sequence of the bits of the control channel after channel encoding, the demodulation reference signal sequence of the control channel, or a scrambling sequence of CRC for channel encoding of the control channel; or the number of seventh-type control channel elements included in a sixth-type control channel element. The sixth-type control channel element includes one or more seventh-type control channel elements, and each of the second-type control channel elements includes one or more sixth-type control channel elements.

According to an embodiment of the present disclosure, at least one of the first-type preset condition, the second-type preset condition, or the third-type preset condition includes, but is not limited to, at least one of conditions described below. Two parameters have the same value. A difference between values of two parameters satisfies a fourth-type preset condition, which is not limited thereto, where the fourth-type preset condition includes the following: the difference is equal to a preset value, the difference belongs to a preset range, and a minimum interval of the difference is greater than a preset eighth predetermined value. A combination of values of two parameters belongs to a preset set. Two parameters have different values. An intersection set of values of two parameters satisfies a fifth-type preset condition, which is not limited thereto, where the fifth-type preset condition includes one of the following: the intersection set is empty, the intersection set is non-empty, the number of elements included in the intersection set is not less than a preset value, or the number of elements included in the intersection set is not greater than a preset value. A difference set of values of two parameters satisfies a sixth-type preset condition, which is not limited thereto, where the sixth-type preset condition includes the following: the difference set is empty, the difference set is non-empty, the number of elements included in the difference set is not less than a preset value, or the number of elements included in the difference set is not greater than a preset value. A maximum value of the number of different values of H parameters is unable to exceed an agreed threshold. A maximum difference between any two parameters of H parameters is unable to exceed a predetermined threshold.

Alternatively, an intersection set of H parameters satisfies a fifth-type preset condition, which is not limited thereto. The two parameters are parameters of two of the H first-type control channel elements or parameters of two second-type control channel elements where two of the H first-type control channel elements are located. The H parameters are H parameters of the H first-type control channel elements or H parameters of H second-type control channel elements where the H first-type control channel elements are located.

According to an embodiment of the present disclosure, a first parameter does, without limitation, satisfy a first preset condition, and a second parameter does, without limitation, satisfy a second preset condition, where the first parameter and the second parameter belong to a fourth type of parameters, and the first preset condition and the second preset condition belong to the fourth-type preset condition; or different parameters among a fourth type of parameters need, without limitation, satisfy different fourth-type preset conditions. The fourth type of parameters may be, but is not limited to, one of the first-type parameter, the second-type parameter, or the third-type parameter. The fourth-type preset condition is one of the first-type preset condition, the second-type preset condition, or the third-type preset condition.

According to an embodiment of the present disclosure, a maximum value of the number of first-type control channel elements including the same control channel information, which are successfully monitored by the communication node, of the H first-type control channel elements is a predetermined value, where the maximum value is less than or equal to H; and/or the number of first-type control channel elements including the same control channel information, which are successfully monitored by the communication node, of the H first-type control channel elements is associated with information about time where the first-type control channel elements are located; and/or the communication node assumes that the H first-type control channel elements include the same control channel information. That is, in an example, the communication node device may firstly assume that the H first-type control channel elements include the same control channel information when performing a monitoring and then determine the number of first-type control channel elements including the same control channel information and successfully monitored based on a specific monitoring result, where the number must be less than or equal to H.

According to an embodiment of the present disclosure, the H first-type control channel elements are counted as one blind monitoring when the blind monitoring of the control channel is counted; and/or control channel elements (CCEs) having a correspondence and included in the H first-type control channel elements are counted as one CCE when the CCE is counted.

According to an embodiment of the present disclosure, in the case where the H first-type control channel elements include the same control channel information, a table of a mapping relationship between a value of an information bit field in the same control channel information and indication information is determined according to the second-type control channel element where the first-type control channel elements are located.

According to an embodiment of the present disclosure, a correspondence exists between an index of the second-type control channel element and the table of the mapping relationship; and/or the table of the mapping relationship is configured in configuration information of the second-type control channel element; and/or at least two second-type control channel elements correspond to different tables of mapping relationships.

According to an embodiment of the present disclosure, a group of candidate control channels is constituted according to the signaling information and/or an agreed rule. The group of candidate control channels satisfies at least one of characteristics described below, which is not limited thereto. Any two candidate control channels in the group of candidate control channels include the same control channel information. All candidate control channels in the group of candidate control channels include the same control channel information. A receiving end assumes that a sending end sends the same control channel information in at most Z predetermined candidate control channels in the group of candidate control channels. Each candidate control channel in the group of candidate control channels is associated with one piece of third information. The third information includes one or more of: an index of a search space set, an index of a search space, an index of a component carrier, index information of a candidate control channel, an index of a time domain occasion of a search space set, an index of a time domain occasion of a search space, or an index of a control resource set. Alternatively, at least two candidate control channels in the group of candidate control channels have different third information.

According to an embodiment of the present disclosure, that the H first-type control channel elements include the same control channel information includes a first-type same case of the control channel information. The first-type same case satisfies at least one of characteristics described below, which is not limited thereto. Control information included in the H first-type control channel elements before channel encoding has the same bits. Scrambling sequences of cyclic shifts for channel encoding of the H first-type control channel elements are the same. Control information included in the H first-type control channel elements after channel encoding has different bits. The H first-type control channel elements have different aggregation levels. Scrambling sequences of the H first-type control channel elements after channel encoding are different. Alternatively, the H first-type control channel elements are counted as one blind monitoring when the blind monitoring of the control channel is counted.

According to an embodiment of the present disclosure, that the H first-type control channel elements include the same control channel information includes a second-type same case of the control channel information. The second-type same case satisfies at least one of characteristics described below, which is not limited thereto. The control information included in the H first-type control channel elements before channel encoding has the same bits. The scrambling sequences of the cyclic shifts for channel encoding of the H first-type control channel elements are the same. The control information included in the H first-type control channel elements after channel encoding has the same bits. A aggregation level of a control channel element 1 is an integer multiple of a aggregation level of a control channel element 2. One subcarrier in a control channel element 2 corresponds to one or more subcarriers in a control channel element 2, where subcarriers with a correspondence include the same modulation symbol. The H first-type control channel elements have the same aggregation level. The scrambling sequences of the H first-type control channel elements after channel encoding are the same. Modulation symbols transmitted in the H first-type control channel elements are the same. Modulation symbols transmitted in subcarriers with a correspondence in the H first-type control channel elements are the same. The H first-type control channel elements are counted as one blind monitoring when the blind monitoring of the control channel is counted. Alternatively, the control channel elements (CCEs) having the correspondence and included in the H first-type control channel elements are counted as one CCE when the CCE is counted. The control channel element 1 and the control channel element 2 are two control channel elements of the first-type control channel elements.

According to an embodiment of the present disclosure, that the H first-type control channel elements include the same control channel information includes a third-type same case of the control channel information. The third-type same case satisfies at least one of characteristics described below, which is not limited thereto. The H control channel elements include the same information bits. The H control channel elements include different indication information. Alternatively, at least two of the H control channel elements correspond to different mapping tables between information bit fields and indication information.

Therefore, in an example embodiment, whether a type of the same control channel information included in the H first-type control channel elements is, for example, the first type of same control channel information or the second type of same control channel information or the third type of same control channel information may be determined according to the signaling information and/or the agreed rule. In another example embodiment, in the case where the H first-type control channel elements including the same control channel information include the second type of same control channel information, a correspondence between fifth-type control channel elements included in any two of the H first-type control channel elements is determined according to the signaling information and/or the agreed rule. In the case where the H first-type control channel elements including the same control channel information include the third type of same control channel information, the same control information included in the H first-type control channel elements includes selection information of a mapping table of the bit field, where the mapping table is in an activated state currently. In the case where the H first-type control channel elements including the same control channel information include the second type of same control channel information, the H first-type control channel elements have one or more of the following same mapping manners: a mapping manner from candidate control channels to CCEs or the mapping manner from CCEs to precoding resource groups.

Figure 3:
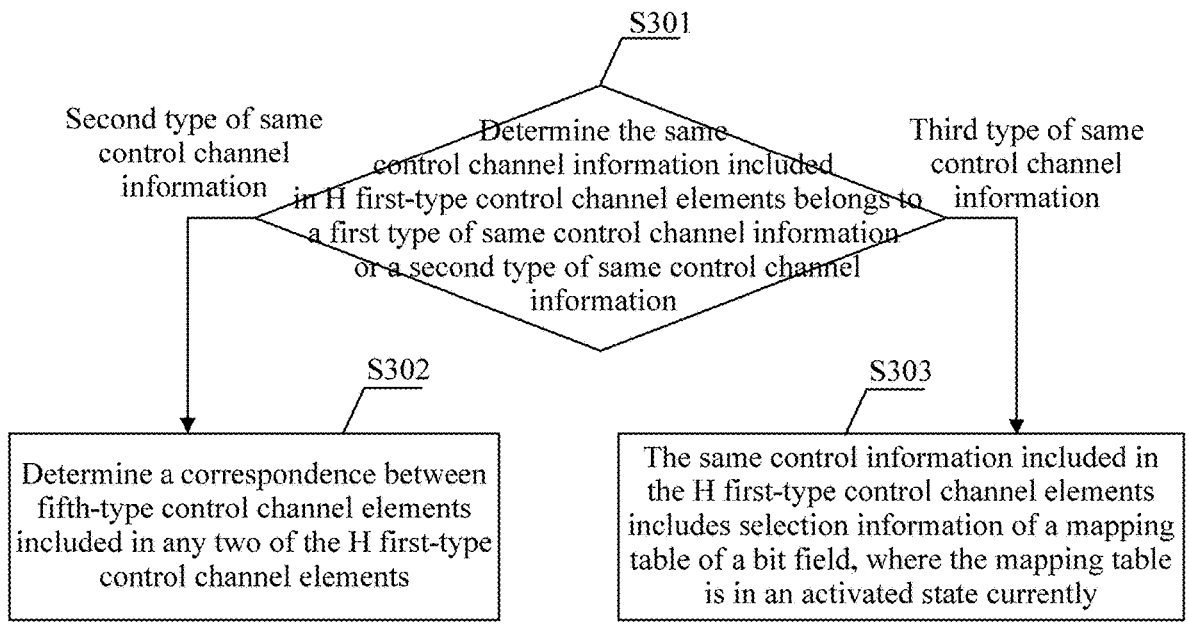
FIG. 3 is a flowchart in which a type of the same control channel information is determined according to an embodiment of the present disclosure.

According to an embodiment of the present disclosure, a process of determining that the H first-type control channel elements include the same control channel information may be shown in FIG. 3. The process may include steps S301 to S303.

In step S301, the type of the same control channel information included in the H first-type control channel elements is determined according to the signaling information and/or the agreed rule. If the same control channel information belongs to the second type of same control channel information, S302 is performed. If the same control channel information belongs to the third type of same control channel information, S303 is performed.

In step S302, the correspondence between the fifth-type control channel elements included in any two of the H first-type control channel elements is determined according to the signaling information and/or the agreed rule.

In step S303, the same control information included in the H first-type control channel elements includes the selection information of the mapping table of the bit field, where the mapping table is in the activated state currently.

According to an embodiment of the present disclosure, one or more of the first-type control channel element, the second-type control channel element, or the fifth-type control channel element includes at least one of: the control resource set, the control channel search space set, the control channel search space, the time domain occasion of the control channel search space set, the time domain occasion of the control channel search space, a candidate control channel element, the control channel element (CCE), the quasi co-location resource group, the precoding resource group, a resource element group (REG), a resource element (RE), or information about a control channel demodulation reference signal.

According to an embodiment of the present disclosure, the quasi co-location resource group satisfies at least one of characteristics described below, which is not limited thereto. Channels and/or signals in one quasi co-location resource group have the same quasi co-location reference signal set. Each quasi co-location resource group corresponds to one quasi co-location reference signal set. Channels and/or signals in different quasi co-location resource groups do not satisfy the quasi co-location relationship with respect to one type of quasi co-location parameters, which is not limited thereto. The one type of quasi co-location parameters includes at least one of a Doppler shift, a Doppler spread, an average delay, a delay spread, a spatial reception parameter, or an average gain. One demodulation reference signal port corresponds to one quasi co-location reference signal set in each quasi co-location resource group. One demodulation reference signal port does not satisfy the quasi co-location relationship with respect to one type of quasi co-location parameters in different quasi co-location resource groups, which is not limited thereto. One sixth-type control channel element includes more than one quasi co-location resource group. An index of a CCE is independently calculated in each quasi co-location resource group in one sixth-type control channel element. One quasi co-location resource group includes k precoding resource groups, where k is a positive integer greater than or equal to 1. A boundary of the quasi co-location resource group coincides with a boundary of the precoding resource group, where the boundary includes a time domain boundary and/or a frequency domain boundary. A resource in one precoding resource group does not belong to more than one quasi co-location resource group. A quasi co-location resource groups are associated with A quasi co-location reference signal sets, and each of the A quasi co-location resource groups is associated with one of the A quasi co-location reference signal sets. Alternatively, a division of the quasi co-location resource group is obtained according to the signaling information and/or the agreed rule. The sixth-type control channel element includes one of the control resource set (CORESET), the control channel search space set, the control channel search space, the time domain occasion of the control channel search space set, the time domain occasion of the control channel search space, or the candidate control channel.

Figure 4:
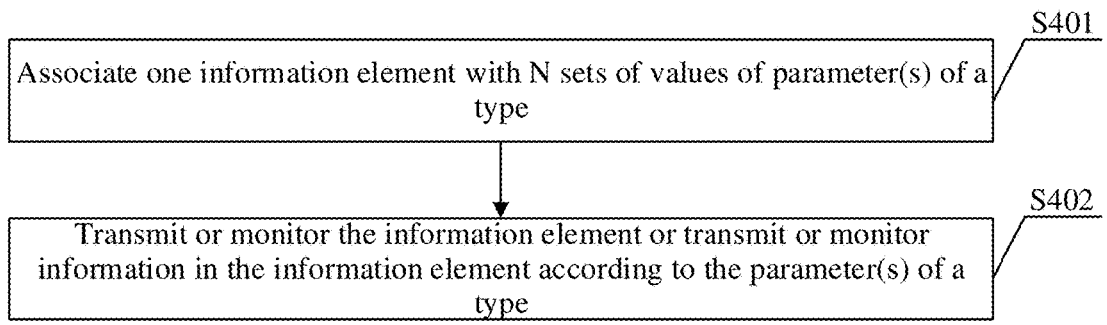
FIG. 4 is a flowchart of an information element transmission method according to an embodiment of the present disclosure.

An embodiment of the present disclosure further provides an information element transmission method. As shown in FIG. 4, the method may include steps S401 and S402.

In step S401, one information element is associated with N sets of values of parameter(s) of a type.

In step S402, the one information element is transmitted or monitored or information in the information element is transmitted or monitored according to the parameter(s) of a type. A transmission includes sending or receiving.

According to an embodiment of the present disclosure, the one information element may be, but is not limited to, at least one of one channel, one signal, one control channel resource element, one data channel codeword, control channel information, or one signal port. N is a positive integer greater than or equal to 1.

According to an embodiment of the present disclosure, the N sets of values may satisfy at least one of characteristics described below, which is not limited thereto. The N sets of values correspond to M repeated transmissions of the information element. The N sets of values correspond to one redundancy version pattern bitmap of one information element, where the redundancy version pattern bitmap includes M redundancy version elements. Alternatively, N has different values or the same value for different types of information elements. M and N satisfy at least one of the following characteristics: M is a positive integer greater than or equal to 2; M=x*N, where x is a positive integer greater than or equal to 1 and x repeated transmissions of the information element correspond to one set of values among the N sets of values; N=x1*M, where x1 is a positive integer greater than or equal to 1 and one transmission of the information element corresponds to x1 sets of values among the N sets of values.

According to an embodiment of the present disclosure, the parameter(s) of a type may include, but is not limited to, at least one of a quasi co-location parameter set, a phase tracking reference signal, a demodulation reference signal sequence, a redundancy version, a time domain resource, a frequency domain resource, a channel scrambling sequence, a control resource set, a precoding resource group, information about a quasi co-location resource group, or transmission configuration information (TCI). Different parameters among the parameter(s) of a type correspond to the same value or different values of N.

According to an embodiment of the present disclosure, one data channel (that is, the one information element in the embodiment of the present disclosure) is scheduled by N pieces of control channel information (that is, one of the parameter(s) of a type in the embodiment of the present disclosure), and each of the N pieces of control channel information includes information about a transmission parameter of the one data channel.

According to an embodiment of the present disclosure, it may also be set that one demodulation reference signal port (that is, the one information element in the embodiment of the present disclosure) and each of N sets of quasi co-location reference signal sets (that is, one of the parameter(s) of a type in the embodiment of the present disclosure) satisfy a quasi co-location relationship with respect to one type of quasi co-location parameter; and/or a phase deviation of one demodulation reference signal is acquired according to each of N sets of phase tracking reference signals; N sets of demodulation reference signal sequences correspond to N sets of demodulation reference signal sequence generation parameters; and/or N sets of channel scrambling sequences correspond to N sets of channel scrambling sequence generation parameters. P is a positive integer less than or equal to N.

According to an embodiment of the present disclosure, configuration information of a first parameter among the parameter(s) of a type includes configuration information of a second parameter among the parameter(s) of a type; and/or the N sets of values of the parameter(s) of a type that are associated with one demodulation reference signal correspond to M repeated transmissions of one channel, where an intersection set between resources occupied by different transmissions among the M repeated transmissions of the one channel is non-empty and/or a difference set between resources occupied by different transmissions among the M repeated transmissions of the one channel is empty, and the resources include time domain resources and/or frequency domain resources.

According to an embodiment of the present disclosure, N1 control resource sets (CORESETs) are configured in one control channel search space set; and/or one control channel element is associated with N2 scrambling sequence parameters; and/or the one control channel element is associated with N3 demodulation reference signal ports; and/or the one control channel element is associated with N4 quasi co-location resource groups; where N1, N2, N3, and N4 are positive integers greater than or equal to 1.

According to an embodiment of the present disclosure, that the one control channel element is associated with the N2 scrambling sequence parameters satisfies at least one of characteristics described below, which is not limited thereto. The N2 scrambling sequence parameters are configured for the one control channel element in first control signaling. In an example, an activated scrambling sequence parameter is used by a control channel of control channel resources. One or more of the N2 scrambling sequence parameters is activated for the control channel element in second control signaling. The scrambling sequence parameters include a generation parameter of a scrambling sequence of bits of control information transmitted in the control channel resource element after channel encoding. Alternatively, the scrambling sequence parameters include a generation parameter of a demodulation reference signal sequence of a control channel transmitted in the control channel resource element. The first control signaling is radio resource control (RRC) signaling and the second control signaling is a medium access control-control element (MAC-CE) command; or the first control signaling is RRC signaling and the second control signaling is a downlink control information (DCI) command; or the first control signaling is MAC-CE signaling and the second control signaling is a DCI command.

According to an embodiment of the present disclosure, that the one control channel element is associated with the N3 demodulation reference signal ports satisfies at least one of characteristics described below, which is not limited thereto. The N3 demodulation reference signal ports include a first port and a second port that are orthogonal. Alternatively, the N3 demodulation reference signal ports include a third port and a fourth port that do, without limitation, satisfy at least one of the following characteristics: the third port and the fourth port are pseudo-orthogonal, the third port and the fourth port correspond to different demodulation reference signal sequences, or the third port and the fourth port correspond to the same index of a demodulation reference signal port. In an example, different demodulation reference signal sequences are pseudo-noise (PN) sequences or Zadoff-Chu (ZC) sequences.

According to an embodiment of the present disclosure, a time-frequency resource corresponding to the N3 demodulation reference signal ports includes N3 repeated transmissions of one piece of control information. That is, in an example embodiment, one control channel is repeatedly transmitted in channel resources corresponding to N3 demodulation reference signals. For example, a transmit diversity manner is used or the complete information of the one control channel is transmitted in a channel resource corresponding to each demodulation reference signal, where channel decoding may be performed independently. Alternatively, different channel encoding redundancy versions of one piece of control channel information are transmitted in channel resources corresponding to different demodulation reference signals.

According to an embodiment of the present disclosure, one data channel is scheduled by N control channels, and each of the N control channels includes information about a transmission parameter of the one data channel.

According to an embodiment of the present disclosure, the information element is associated with N quasi co-location resource groups, where each of the N quasi co-location resource groups includes k precoding resource groups, and k is a positive integer greater than or equal to 1.

According to an embodiment of the present disclosure, the M repeated transmissions of the information element are associated with N sets of transmission parameters, where a predetermined transmission parameter of the transmission parameters uses one set of the N sets of values for the M repeated transmissions. Alternatively, the M repeated transmissions of the information element are associated with N sets of transmission parameters, where in the case where a predetermined condition is, without limitation, satisfied, a predetermined transmission parameter of the transmission parameters uses one set of the N sets of values for the M repeated transmissions.

According to an embodiment of the present disclosure, the information element is a transmission block; and/or each of the transmission parameters includes one or more of a modulation and coding rate, a redundancy version, a codeword index, or a channel scrambling sequence parameter; and/or the predetermined transmission parameter includes one or more of the codeword index, the channel scrambling sequence parameter, or the modulation and coding rate; and/or the predetermined condition includes one or more of the following conditions: the same modulation and coding rate is used for repeated transmissions of the transmission block, the same redundancy version is used for repeated transmissions of the transmission block, the M repeated transmissions are scheduled by one control channel, or an interval between resources occupied by the M repeated transmissions satisfies a predetermined characteristic, which is not limited thereto.

According to an embodiment of the present disclosure, one bit field in one piece of control information is associated with N mapping tables, where the mapping tables are mapping relationships between bit field values and indication information; and/or N channels are scheduled by one piece of control information.

According to an embodiment of the present disclosure, the N mapping tables correspond to the N channels, respectively; and/or the N channels have different transmission parameters; and/or the bit field includes at least one of a demodulation reference signal information bit field, a TCI bit field, a process number information bit field, or a code block group (CBG) bit field; and/or the N mapping tables correspond to N control channel elements where the one piece of control information is located, respectively; and/or indication information of a transmission of the one piece of control information is obtained according to the one piece of control information and configuration information in the N control channel elements; and/or the one piece of control information includes selection information of a mapping table, which is in an activated state currently, of the one bit field among the N mapping tables. The N control channel elements are the N control channel elements where the one piece of control information is located.

According to an embodiment of the present disclosure, associating the one information element with the N sets of values of the parameter(s) of a type includes that the parameter(s) of a type of the one information element has N sets of activated values.

According to an embodiment of the present disclosure, the control channel element includes one of: a control resource set (CORESET), a control channel search space set, a control channel search space, a time domain occasion of a control channel search space set, a time domain occasion of a control channel search space, a candidate control channel element, a control channel element (CCE), a quasi co-location resource group, a precoding resource group, a resource element group (REG), a resource element (RE), or information about a control channel demodulation reference signal.

According to an embodiment of the present disclosure, the information element transmission method includes at least one of: determining a value of N or a maximum value of N according to signaling information or a preset rule; determining a value of N or a maximum value of N according to a type of the information element; or determining a value of N or a maximum value of N according to a value of a parameter among the parameter(s) of a type.

For example, in an example embodiment, the one information element includes B1 quasi co-location resource groups in frequency domain; and/or the one information element includes B2 quasi co-location resource groups in time domain; and/or the one information element includes B3 precoding resource groups in the time domain.

According to an embodiment of the present disclosure, second information of the one information element may be associated with at least one of B1, B2, B3, or k. The second information includes one or more of the number R of repeated transmissions of the one information element, information about a demodulation reference signal of the one information element, or information about a quasi co-location reference signal of the one information element.

According to an embodiment of the present disclosure, B1, B2, B3, and k may, without limitation, satisfy one of the following characteristics: R is an integer multiple of B1; R is an integer multiple of B2; R is an integer multiple of B3; R is an integer multiple of B1*B2; R is an integer multiple of B1*B2*k; B1 is an integer multiple of R; B2 is an integer multiple of R; B3 is an integer multiple of R; B1*B2 is an integer multiple of R; or B1*B2*k is an integer multiple of R.

According to an embodiment of the present disclosure, at least one of B1, B2, B3, k, or a division of the quasi co-location resource groups may, without limitation, be acquired according to the signaling information or the preset rule.

According to an embodiment of the present disclosure, the quasi co-location resource group satisfies at least one of characteristics described below, which is not limited thereto. Channels and/or signals in one quasi co-location resource group have the same quasi co-location reference signal set. Each quasi co-location resource group corresponds to one quasi co-location reference signal set. Channels and/or signals in different quasi co-location resource groups do not satisfy the quasi co-location relationship with respect to one type of quasi co-location parameters, which is not limited thereto. An index of a CCE is independently calculated in each quasi co-location resource group in the one control channel element. A boundary of the quasi co-location resource group coincides with a boundary of the precoding resource groups, where the boundary includes a time domain boundary and/or a frequency domain boundary. A resource in one precoding resource group does not belong to more than one quasi co-location resource group. A quasi co-location resource groups are associated with A quasi co-location reference signal sets, and each of the A quasi co-location resource groups is associated with one of the A quasi co-location reference signal sets. One demodulation reference signal port corresponds to one quasi co-location reference signal set in each quasi co-location resource group. One demodulation reference signal port does not satisfy the quasi co-location relationship with respect to one type of quasi co-location parameters in different quasi co-location resource groups, which is not limited thereto. A communication node assumes that channels and/or signals in the precoding resource group have the same precoding. Alternatively, a communication node assumes that channels and/or signals in different precoding resource groups have different precoding. The communication node is a communication node that receives the channels and/or the signals.

According to an embodiment of the present disclosure, the maximum number of data channels that are capable of being received by the communication node is determined according to the signaling information and/or an agreed rule, where an intersection set between time domain resources occupied by multiple data channels is non-empty; and/or the multiple data channels are scheduled by multiple control channels, respectively and the multiple control channels are scrambled by using a cell radio network temporary identifier (C-RNTI).

For ease of understanding, embodiments are described below in conjunction with specific examples. In the following examples, a quasi co-location reference signal set includes one or more reference signals, each reference signal is associated with one or more quasi co-location parameters, the number of reference signals associated with one quasi co-location parameter in the quasi co-location reference signal set cannot be greater than 1, and the number of reference signals associated with one quasi co-location parameter in multiple quasi co-location reference signal sets may be greater than 1. An intersection set between quasi co-location parameter sets associated with different quasi co-location reference sets is non-empty. The quasi co-location parameter includes at least one of a Doppler shift, a Doppler spread, a delay spread, an average delay, an average gain, a spatial reception parameter, or a receive antenna group.

In the following examples, an association between two elements includes, but is not limited to, at least one of the following: a transmission parameter of one element is the other element, a value of one element is obtained according to a value of the other element, a value range of one element is obtained according to a value or a value range of the other element, or some combinations of values of the two elements cannot appear at the same time.

An association between one element and a parameter value includes, but is not limited to, at least one of the following: the parameter value is a parameter value activated for the one element, a parameter value activated for the one element belongs to a list of the associated parameter value, the parameter value is a parameter value activated for the one element, or the element is transmitted according to the activated parameter value.

A transmission of an element includes at least one of sending the element or receiving the element.

In the following examples, a control channel element includes, but is not limited to, at least one of a control resource set (CORESET), a control channel search space set, a control channel search space, a time domain occasion of a control channel search space set, a time domain occasion of a control channel search space, a candidate control channel, a control channel element (CCE), a quasi co-location resource group, a precoding resource group, a resource element group (REG), a resource element (RE), or information about a control channel demodulation reference signal. One resource element (RE) is one subcarrier, a predetermined number of REs constitute one REG, a predetermined number of REGs constitute one precoding group, a predetermined number of precoding groups constitute one CCE, a predetermined number of CCEs constitute one candidate control channel, one or more candidate control channels with the same aggregation level constitute one control channel search space, multiple control channel search spaces with different aggregation levels constitute one control channel search space set, one control channel search space set has multiple time domain occasions in time domain, and a frequency domain resource where one control channel search space set is located is obtained by one or more control resource sets (CORESETs) associated with the one control channel search space set. One CORESET/one search space set/one search space/one time domain occasion of one search space set/one time domain occasion of one search space includes one or more quasi co-location resource groups in frequency domain and/or includes one or more quasi co-location resource groups in time domain.

In the following examples, "predetermined" represents a parameter, condition, or rule pre-negotiated by a sending end and a receiving end. A pre-negotiation includes a negotiation via signaling, pre-fixing a value, or deriving a parameter value by a predetermined rule.

In the following examples, control channel information includes one or more of downlink control information (DCI), that is, control information described below, cyclic redundancy check bits obtained based on DCI, a scrambling sequence of cyclic redundancy check bits, information bits of control information after channel encoding, a scrambling sequence of information bits after channel encoding, or a modulation symbol transmitted in a control channel.

In the following examples, one control channel may be one PDCCH including one or more pieces of DCI.

In an example, each CORESET may be configured with one sequence parameter for generating the following sequence: a scrambling sequence of bits of DCI after channel encoding in the CORESET or a demodulation reference signal sequence of a control channel in the CORESET. Each CORESET may be configured with one quasi co-location reference signal set, where a demodulation reference signal in the CORESET and a reference signal in the quasi co-location reference signal set satisfy a quasi co-location relationship with respect to one type of quasi co-location parameters.

Figure 5:
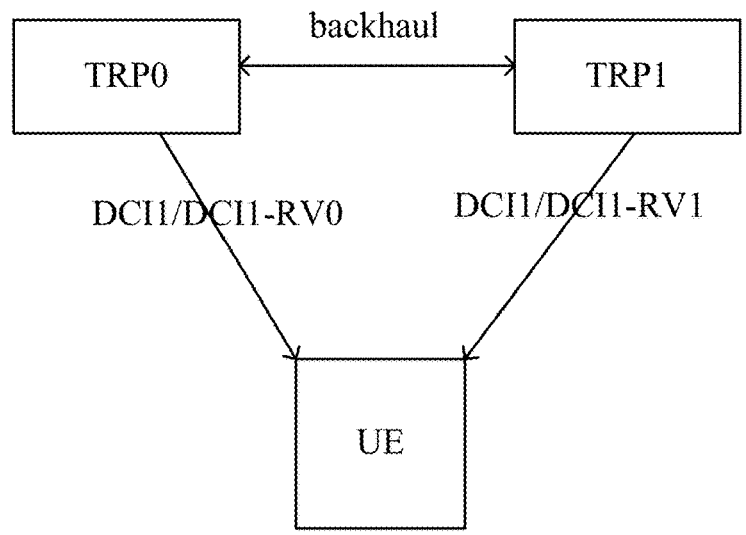
FIG. 5 is a schematic diagram illustrating that two TRPs transmit the same piece of DCI according to an embodiment of the present disclosure.

In an example, to increase the robustness of the PDCCH and/or the transmission coverage distance of the PDCCH, the same control information may be repeatedly sent through multiple candidate control channels. In particular, in high frequency communications, to further increase the robustness of the PDCCH, preferably multiple candidate control channels may use different spatial domain resources. As shown in FIG. 5, the multiple candidate control channels that are repeatedly sent by different transmission reception points (TRPs) (TRP0 and TRP1 in FIG. 5). One or more of the following example schemes may, without limitation, be used.

Figure 6:
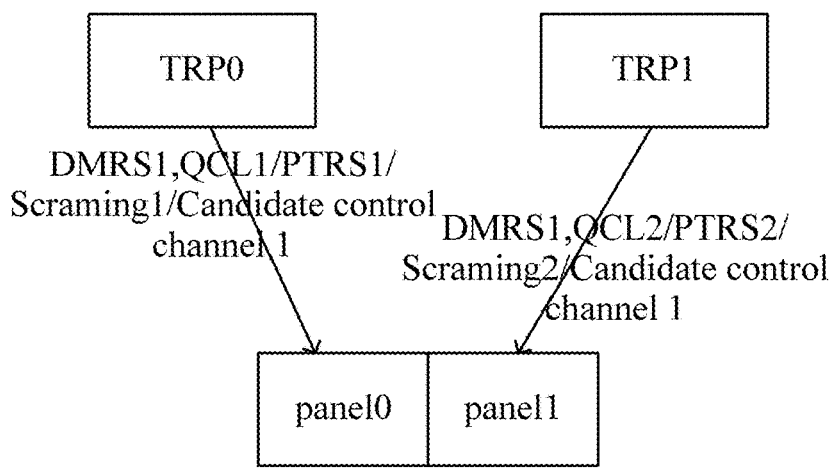
FIG. 6 is a schematic diagram of a DCI transmission according to an embodiment of the present disclosure.

Scheme one: as shown in FIG. 6, one control channel demodulation reference signal port is configured with more than one set of second information. The second information includes at least one of a quasi co-location reference signal set (QCL in FIG. 6), a phase tracking reference signal set (PTRS in FIG. 6), or a sequence parameter (Scraming in FIG. 6). The sequence parameter includes the following sequence parameter for generating at least one of the following sequences: a scrambling sequence of bits of a control channel after channel encoding, a demodulation reference signal sequence of a control channel, or a scrambling sequence of a cyclic redundancy check bits for channel encoding of a control channel. As shown in FIG. 6, different sets of second information of one demodulation reference signal correspond to different transmissions of a candidate control channel. In FIG. 6, each of multiple sets of second information corresponds to one spatial domain channel, each spatial domain channel may be regarded as corresponding to one time domain grid and/or one frequency domain grid, a time-frequency resource of the candidate control channel may be regarded as multiple candidate control channels in multiple spatial domain channels, one piece of control information is repeatedly transmitted in the multiple spatial domain channels or one piece of control information is repeatedly transmitted in the multiple candidate control channels, where an intersection set between time-frequency resources occupied by the multiple candidate control channels is non-empty and/or a difference set between the time-frequency resources occupied by the multiple candidate control channels is empty.

In scheme one, configuration information of the PTRS and the sequence parameter may be added to a configuration of transmission configuration information (TCI) of the quasi co-location reference signal set; or an association among the TCI, the PTRS, and the sequence parameter is established. The TCI is used for configuring the quasi co-location reference signal set of a target reference signal, the quasi co-location reference signal set includes one or more reference signals, each reference signal is associated with one type of quasi co-location parameters, the target reference signal and the reference signal in the quasi co-location reference signal set satisfy a quasi co-location relationship with respect to the one type of quasi co-location parameters. As shown in Table 1, CSI-RS1 and CSI-RS2 are configured in TCI1, CSI-RS1 is associated with quasi co-location parameters {Doppler shift, Doppler spread, average delay, delay spread}, and CSI-RS2 is associated with a quasi co-location parameter, that is, the spatial reception parameter. When configuration information of a quasi co-location reference signal set of DMRS1 is configured to be TCI1, it indicates that DMRS1 and CSI-RS1 satisfy the quasi co-location relationship with respect to {Doppler shift, Doppler spread, average delay, delay spread}, and DMRS1 and CSI-RS2 satisfy the quasi co-location relationship with respect to {spatial reception parameter}. Moreover, a PTRS parameter and a sequence scrambling parameter are also configured in the TCI. In table 1, one DMRS port is associated with more than one piece of TCI, and of course, more than one TCI state may be placed in a larger TCI state, for example, TCI3={TCI1, TCI2}. The quasi co-location parameters of DMRS1 are directly configured to be TCI3. According to an embodiment of the present disclosure, the scheme may also be used for repeated transmissions of a PDSCH, that is, a DMRS of one PDSCH is associated with multiple sets of {TCI, PTRS, channel scrambling sequence parameter} which correspond to multiple spatial domain channels, and PDSCH information corresponding to the DMRS is repeatedly transmitted on the multiple spatial domain channels.

TABLE 1

| Target Reference Signal | TCI Index | (Quasi Co-Location Reference Signal, Quasi Co-Location parameter) | PTRS | Sequence Scrambling Parameter |
|---|---|---|---|---|
| DMRS1 | TCI1 | (CSI-RS1, {Doppler shift, Doppler spread, average delay, delay spread}) (CSI-RS2, {spatial reception parameter}) | PTRS1 | Scraming1 |
|  | TCI2 | (CSI-RS3, {Doppler shift, Doppler spread, average delay, delay spread}) (CSI-RS2, {spatial reception parameter}) (CSI-RS4, {spatial reception parameter}) | PTRS2 | Scraming2 |

Figure 7:
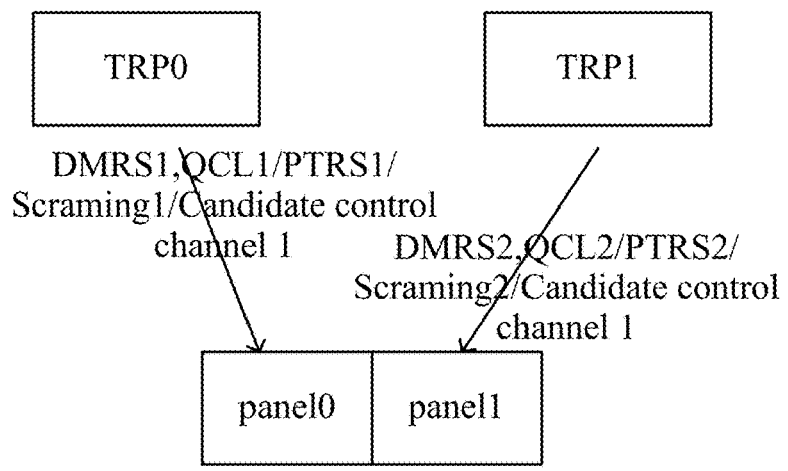
FIG. 7 is a schematic diagram of another DCI transmission according to an embodiment of the present disclosure.

Scheme two: as shown in FIG. 7, more than one orthogonal demodulation reference signal port is configured in the CORESET/search space set (SSS)/search space (SS). The same PDCCH is transmitted using multiple orthogonal demodulation reference signal ports in a transmit diversity manner. Alternatively, each of multiple orthogonal demodulation reference signal ports corresponds to one time-frequency grid and includes one transmission of one piece of control information, where the one piece of control information is repeatedly transmitted in the time-frequency grids corresponding to the multiple orthogonal demodulation reference signal ports. Similarly, one demodulation reference signal port and more than one sequence parameter which correspond to multiple pseudo-orthogonal ports are configured in the CORESET/SSS/SS, where one piece of control information is repeatedly transmitted on the multiple pseudo-orthogonal ports.

Scheme three: a correspondence between candidate control channels included in multiple CORESET/SSS/SSs is established, and candidate control channels with a correspondence in the multiple CORESET/SSS/SSs include the same control information.

Figure 8:
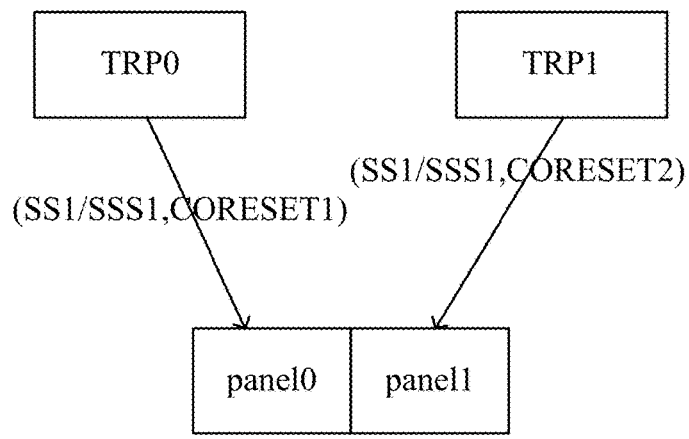
FIG. 8 is a schematic diagram illustrating that the same DCI is transmitted in candidate control channels according to an embodiment of the present disclosure.

As shown in FIG. 8, one SSS/SS (that is, a third control channel element) is associated with multiple CORESETs (that is, fourth control channel elements). According to an embodiment of the present disclosure, different CORESETs correspond to different TRPs. In FIG. 8, SSS1/SS1 includes the same number of candidate channels in CORESET1 and CORESET2. A simple method is to specify that SSS1/SS1 has the same aggregation level in CORESET1 and CORESET2 and two candidate control channels with the same candidate control channel index include the same control information under the same aggregation level. In a search space with one aggregation level, an index of a candidate control channel is $m_{s,n_{CI}}$ in Equation (1). Equation (1) is a mapping formula of a CCE set, which is included in an $m_{s,n_{CI}}$-th candidate control channel in an SS with a aggregation level of L in one SSS, in a CORESET, where the SSS is located. $n_{CI}$ is an index of a CC, $N_{CCE,p}$ is the number of CCEs included in the CORESET, p is an index of the CORESET, and $M_{p,s,max}^{(L)}$ is the maximum number of candidate control channels in all CCs corresponding to SS scheduling. For a dedicated SS, $Y_{p,n_{s,f}}$ is obtained according to Equation (2). For a common SS, $Y_{p,n_{s,f}}=0$.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad (1).$$

$$i = 0, \ldots, L-1$$

where $Y_{p,n_{s,f}^{\mu}} = (A_p \cdot Y_{p,n_{s,f}^{\mu}-1}) \bmod D$, where $Y_{p,-1} = n_{RNTI} \neq 0$, $A_p = 39827$ corresponds to $p \bmod 3=0$, $A_p=39829$ correspond to $p \bmod 3=1$, $A_p=39839$ corresponds to $p \bmod 3=2$, and corresponds to $p \bmod 3=1$ corresponds to $D=65537$ (2).

Figure 9:
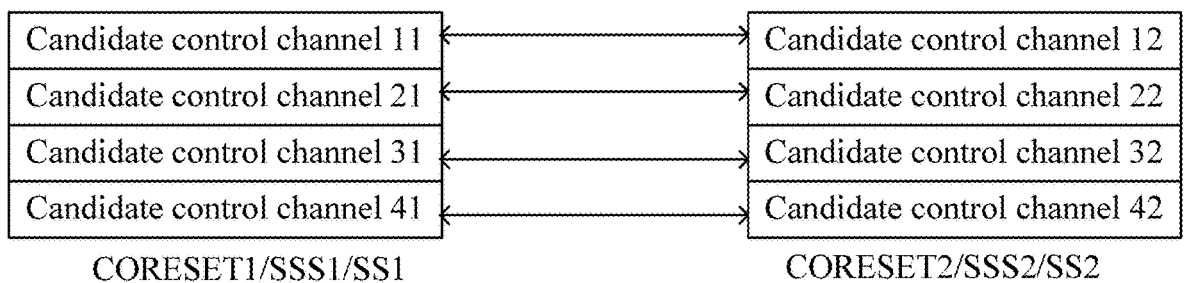
FIG. 9 is a schematic diagram illustrating that candidate control channels with a correspondence include the same control information according to an embodiment of the present disclosure.

Candidate control channels, which are associated with the same candidate control channel index of the same SSS1/SS1, in CORESET1 and CORESET2 are associated, and the candidate control channels with an association include the same transmission information. In the above manner, two TRPs transmit the same candidate control channel with the same aggregation level. That is, candidate control channels, belonging to different CORESETs, of the same SS satisfy a one-to-one correspondence, as shown in FIG. 9.

Figure 10:
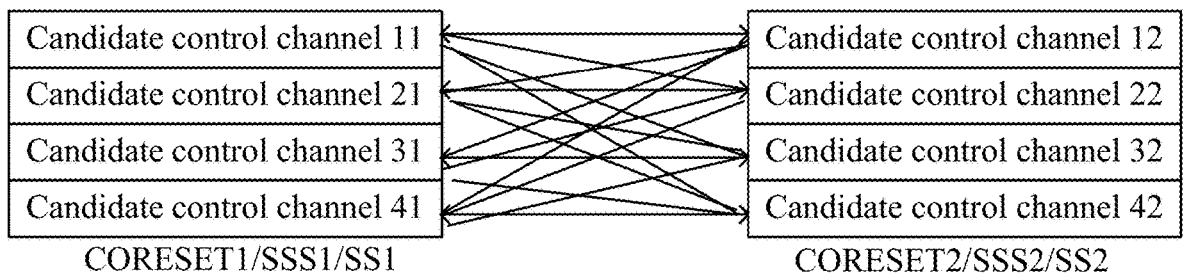
FIG. 10 is another schematic diagram illustrating that candidate control channels with a correspondence include the same control information according to an embodiment of the present disclosure.

Another scheme is to constitute one group of SSS/SS/CORESETs (that is, one group of fourth control channel elements), candidate control channels included in SSS/SS/CORESETs in different groups include the same control information, and candidate control channels included in the SSS/SS/CORESET in the same group do not include the same control information; or candidate control channels included in the SSS/SS/CORESET in the same group include the same control information, and candidate control channels included in SSS/SS/CORESETs in different groups do not include the same control information. According to an embodiment of the present disclosure, since one SSS/SS/CORESET includes multiple candidate control channels, if it is only constrained that candidate control channels included in two SSS/SS/CORESETs include the same control information, the blind monitoring complexity of a terminal is large. As shown in FIG. 10, two CORESETs each include four candidate control channels, and one candidate control channel in CORESET1 may transmit the same control information as four candidate control channels in CORESET2. Thus, the blind monitoring complexity of the terminal is 4*4=16, that is, 16 times blind monitoring is performed are required in total. To reduce the blind monitoring complexity, it may be further constrained that when a first-type parameter(s) associated with two candidate control channels satisfies a first-type agreed condition, the two candidate control channels include the same control information. The first-type agreed condition includes at least one of the following: parameter values of the two candidate control channels are the same; a difference between parameter values of the two candidate control channels satisfies a fourth-type agreed condition, where the fourth-type agreed condition includes that the difference is equal to a predetermined value, that the difference belongs to a predetermined range, or that a minimum interval of the difference is greater than a predetermined value; a combination of parameter values of the two candidate control channels belongs to a predetermined set; parameter values of the two candidate control channels are different; an intersection set between parameter values of the two candidate control channels satisfies a fifth-type agreed condition, where the fifth-type agreed condition includes one of the following: the intersection set is empty, the intersection set is non-empty, the number of elements included in the intersection set is not less than a predetermined value, or the number of elements included in the intersection set is not greater than a predetermined value; a difference set between parameter values of the two candidate control channels satisfies a sixth-type agreed condition, where the sixth-type agreed condition includes that the difference set is empty, that the difference set is non-empty, that the number of elements included in the difference set is not less than a predetermined value, or that the number of elements included in the difference set is not greater than a predetermined value.

According to an embodiment of the present disclosure, that the first-type parameter satisfies the first-type agreed condition includes at least one of the following: Parameter one: indexes of control channel elements where the candidate control channels are located. For example, CORESETs where the two candidate control channels are located have different indexes, SSSs and/or SSs where the two candidate control channels are located have the same index, or CCE/REG/REGBundles included in the two candidate control channels have indexes that are the same/or differ by a fixed value. Parameter two: a minimum index in control channel elements where the candidate control channels are located. For example, starting or highest CCE/REG/REGBundles included in the two candidate control channels have index that are the same/or differ by a fixed value. Parameter three: quasi co-location reference signal sets of the candidate control channels. For example, a difference set between the quasi co-location reference signal sets of the two candidate control channels is non-empty, that is, the two candidate control channels are received through two different sending beams and/or different receiving beams. Parameter four: time domain resources of the candidate control channels. For example, a difference set between time domain symbols occupied by the two candidate control channels is empty, or a maximum interval between the time domain resources occupied by the two candidate control channels cannot exceed a predetermined threshold. The maximum interval represents a time interval between two time domain symbols that are farthest apart among the time domain resources occupied by the two candidate control channels. For example, if a first candidate control channel occupies time domain symbols {1, 2} in slotn and a second candidate control channel occupies time domain symbols {3, 4} in slotn, the time interval between the two candidate control channels is 4−1=3 time domain symbols. Alternatively, the two candidate control channels belong to the same time unit which is one of one slot, one subframe, one frame, or multiple time domain symbols in one slot. Parameter five: frequency domain resources of the candidate control channels. For example, the frequency domain resources occupied by the two candidate control channels do not overlap and/or a frequency domain interval between the frequency domain resources occupied by the two candidate control channels does not exceed a frequency domain predetermined value, for example, the two candidate control channels are in one BWP or one CC. Parameter six: sequence generation parameters of the candidate control channels. A sequence includes at least one of the scrambling sequence of the bits of the control channel after the channel encoding, the demodulation reference signal sequence of the control channel, or a scrambling sequence of cyclic redundancy check bits for the channel encoding of the control channel. For example, the two candidate control channels have the same sequence parameter or different sequence parameters, or some of the preceding three sequence parameters are the same and the rest of the preceding three sequence parameters are different. Parameter seven: demodulation reference signals of the candidate control channels. For example, the two candidate control channels have the same demodulation reference signal. For example, the demodulation reference signals of the two candidate control channels are expected to have the same sequence parameter in two CORESETs. Parameter eight: aggregation levels of the candidate control channels. For example, the aggregation levels of the two candidate control channels are the same or differ by a certain range. Parameter nine: group information of the candidate control channels. The group information is configured in the candidate control channel, or the group information is a group index of an control channel element where the candidate control channel is located, such as one of CORESET, SSS, SS, or TCI Bundle. Candidate control channels belonging to the same group include the same control information. Parameter ten: indexes of serving cells of the candidate control channels. A serving cell ID is $n_{CI}$ in Equation (1). Candidate control channels with the same $n_{CI}$ include the same control information, and candidate control channels with different $n_{CI}$ do not include the same control information. Further, when $n_{CI}$ is an agreed value, the candidate control channels in the two CORESET, or SSS, or SSs include the same control information; otherwise, there is no association between control information included in the candidate control channels in the two CORESET or SSS or SSs. Alternatively, the candidate control channels belonging to different groups include the same control channel information.

Figure 11:
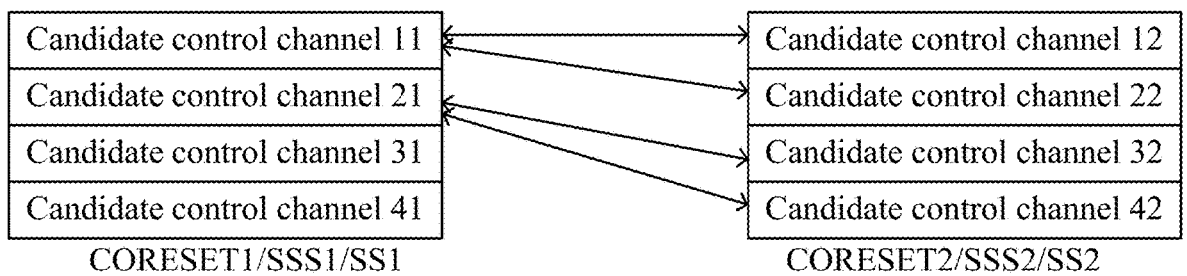
FIG. 11 is another schematic diagram illustrating that candidate control channels with a correspondence include the same control information according to an embodiment of the present disclosure.

As shown in FIG. 11, CORESET1 or SSS1 or SS1 includes four candidate control channels, two of which correspond to $n_{CI}=0$, CORESET2/SSS2/SS2 includes four candidate control channels, all of which correspond to $n_{CI}=0$, and one candidate control channel with $n_{CI}=0$ in CORESET1/SSS1/SS1 has a correspondence with two candidate control channels in CORESET2/SSS2/SS2, so that the terminal only performs blind monitoring 2*2=4 times at the time of the blind monitoring.

Among the preceding multiple control channel elements, one control channel element is one of one CORESET, one SSS, one SS, or one time domain occasion of the SSS/SS. The number of time domain symbols occupied by one time domain occasion of the SSS/SS is configured in the CORESET, and a starting time domain symbol of the one occasion is configured in the SSS/SS.

Scheme four: resources included in one CORESET/SSS/SS are classified as multiple fourth control channel elements (where one group of fourth control channel elements corresponds to one fourth control information element). According to an embodiment of the present disclosure, resources included in one candidate control channel only belong to one fourth control channel element.

Figure 12:
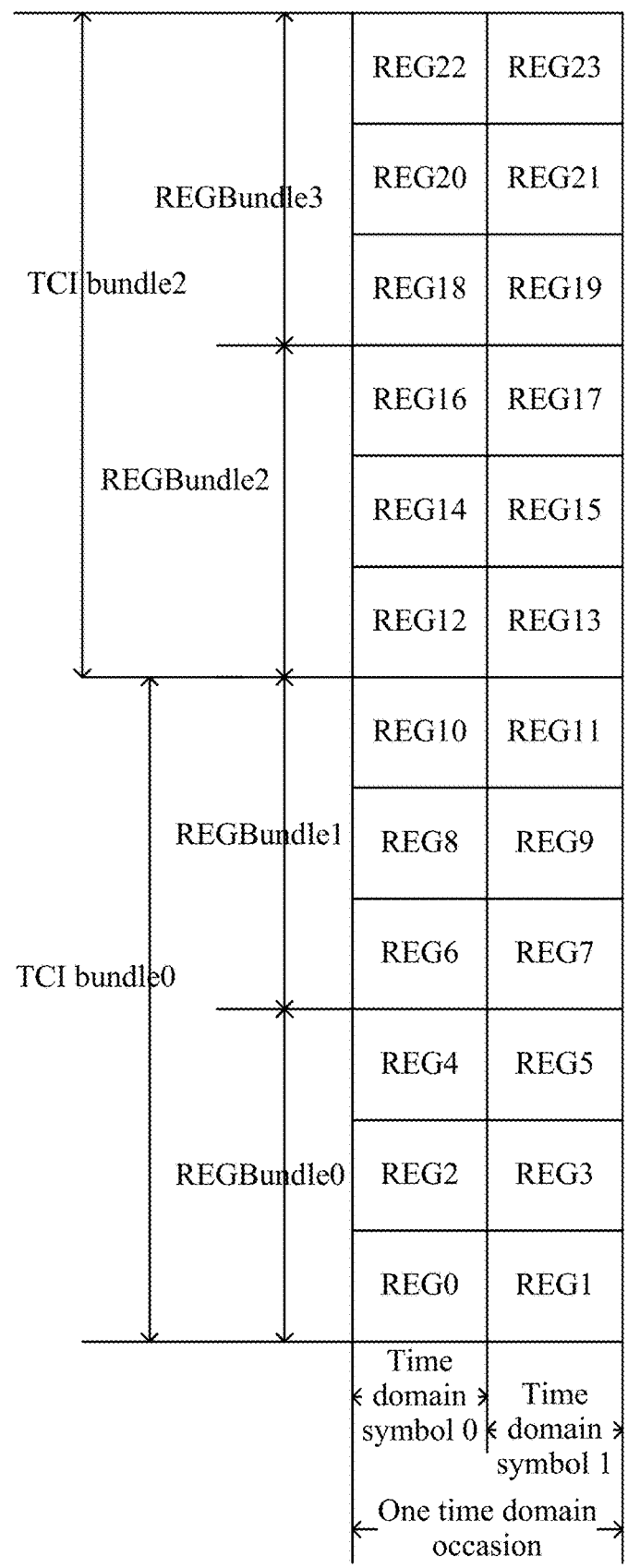
FIG. 12 is a schematic diagram illustrating that one time domain occasion of one control channel search space set/one control channel search space includes two quasi co-location resource groups, TCI bundles, in frequency domain according to an embodiment of the present disclosure.

As shown in FIG. 12, one control channel element is one TCI bundle (that is, the quasi co-location resource group) in one time domain occasion of one SSS/SS. A frequency domain resource belonging to one CORESET in one time domain occasion of one SSS/SS includes more than one TCI bundle. One TCI bundle (that is, the TCI bundle in FIG. 12) includes an integer multiple of REGBundles (that is, REGBundles in FIG. 12 which are the precoding resource groups). One TCI bundle corresponds to one quasi co-location reference signal set, and different TCI bundles may include different quasi co-location reference signal sets. Alternatively, different TCI bundles have the same quasi co-location reference signal or satisfy the quasi co-location relationship with respect to a first type of quasi co-location parameters (such as the spatial reception parameter), and different TCI bundles have different quasi co-location reference signals or do not satisfy the quasi co-location relationship with respect to a second type of quasi co-location parameters (the second type of quasi co-location parameters includes one or more of the following parameters: the Doppler shift, the Doppler spread, the average delay, the delay spread, or the average gain).

Figure 13:
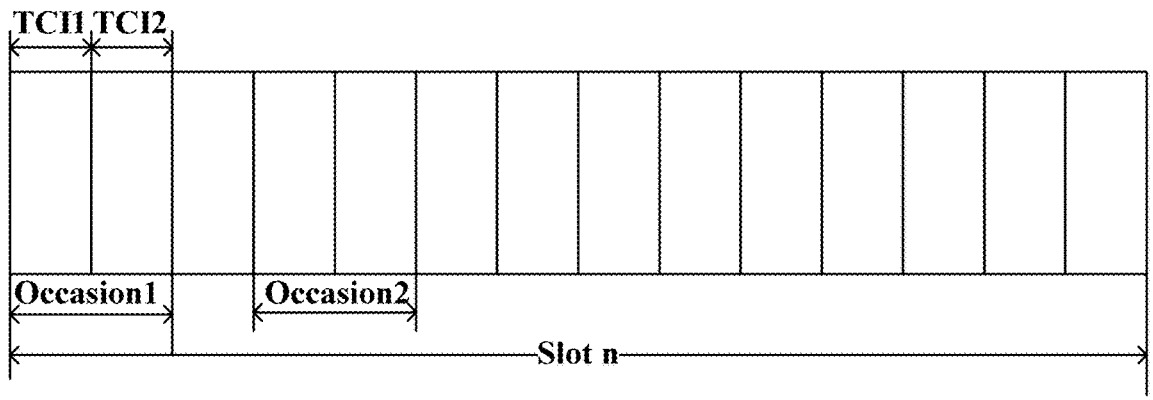
FIG. 13 is a schematic diagram illustrating that one time domain occasion of one control channel search space set/one control channel search space includes two quasi co-location resource groups, TCI bundles, in time domain according to an embodiment of the present disclosure.

In FIG. 12, the number of time domain symbols occupied by one TCI bundle is the same as the number of time domain symbols occupied by one time domain occasion of the SSS/SS. In FIG. 13, the number of time domain symbols occupied by one TCI bundle is smaller than the number of time domain symbols occupied by one time domain occasion of the SSS/SS. Each TCI bundle is associated with one piece of TCI configuration information which is used for configuring the quasi co-location reference signal set of the DMRS of the PDCCH.

In FIGS. 12 and 13, resources occupied by one candidate control channel cannot belong to more than one TCI bundle, resources occupied by one REGBundle cannot belong to more than one TCI bundle, and an intersection set between time domain resources and/or frequency domain resources occupied by different TCI bundles in one SSS/SS/CORESET is empty. The TCI bundle may also be referred to as a quasi co-location group or other names, which is not limited in the embodiments of the present disclosure.

Figure 14:
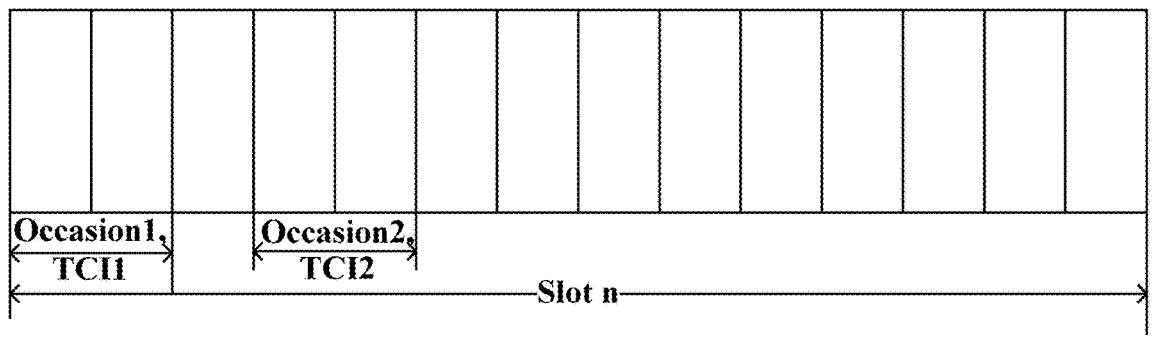
FIG. 14 is a schematic diagram illustrating that two time domain occasions of one control channel search space set/one control channel search space in one slot each correspond to one quasi co-location resource group, TCI bundle, according to an embodiment of the present disclosure.

In FIG. 14, a correspondence is established between candidate control channels included in two occasions of one SSS/SS in one slot, and the two candidate control channels with the correspondence include the same control information.

Figure 15:
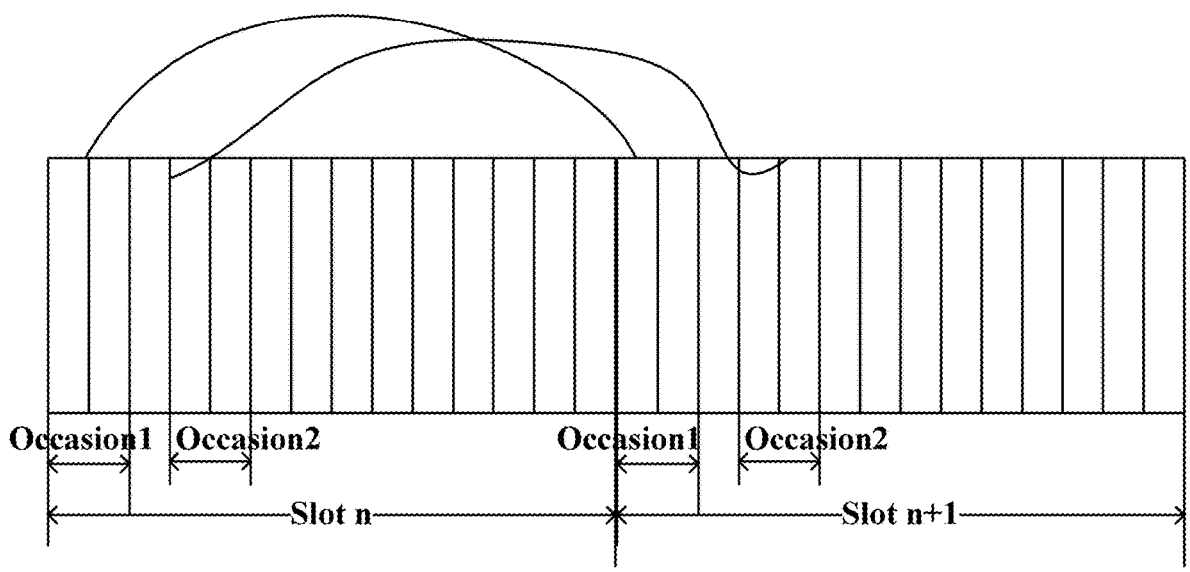
FIG. 15 is a schematic diagram illustrating that two time domain occasions of one control channel search space set/one control channel search space in two slots and with a correspondence each correspond to one quasi co-location resource group, TCI bundle, according to an embodiment of the present disclosure.

In FIG. 15, a correspondence is established between candidate control channels included in two occasions of one SSS/SS in two slots, and two candidate control channels with a correspondence include the same control information. According to an embodiment of the present disclosure, which occasions include the same control information is notified through signaling information and/or an agreed rule. For example, candidate control channels in which occasions include the same control information is determined according to one or more of a frame index, a subframe index, a slot index, or an occasion index.

Scheme five: it is specified that one PDSCH may be scheduled by multiple pieces of DCI, and a transmission parameter of the PDSCH may be got as long as the terminal monitors one of the multiple pieces of DCI.

Scheme six: it is specified that all candidate control channels included in one SSS/SS/CORESET in a predetermined time resource include repeated transmissions of one piece of control information. For example, the predetermined time resource is one or more time domain occasions or one or more slots.

Scheme seven: a group of candidate control channels is established, and any two or more candidate control channels in the group of candidate control channels include the same control information. Each candidate control channel in the group of candidate control channels is associated with one piece of third information, where the third information includes one or more of the following information: an index of the search space set, an index of the search space, an index of the component carrier, index information of the candidate control channel, an index of the time domain occasion of the search space set, an index of the time domain occasion of the search space, or an index of the control resource set. At least two candidate control channels in the group of candidate control channels have different third information.

In the above, two TRPs are used as an example for describing that two candidate control channels include the same control information. Similarly, H candidate control channels including the same control information may be established. According to an embodiment of the present disclosure, the terminal assumes that the H candidate control channels include the same control information, and how many candidate control channels are actually used by a base station for sending the same control information is an implementation of the base station, that is, the number of candidate control channels successfully monitored by the terminal among the H candidate control channels may be less than H. The successful monitoring of one candidate control channel includes that received performance of a demodulation reference signal of the candidate control channel exceeds a predetermined value, the control information is decoded separately using the candidate control channel, and it is derived by cyclic redundancy check bits in the control information that the control information is successfully received.

According to an embodiment of the present disclosure, that H control channel elements include the same control channel information includes a case where the H control channel elements include a first type of same control channel information, where the case satisfies at least one of the following characteristics: control information included in the H candidate control channels before channel encoding has same bits; scrambling sequences of cyclic shifts for channel encoding of the H candidate control channels are the same; control information included in the H candidate control channels after channel encoding has different bits; the H candidate control channels have different aggregation levels; or scrambling sequences of the H candidate control channels after channel encoding are different.

Figure 16:
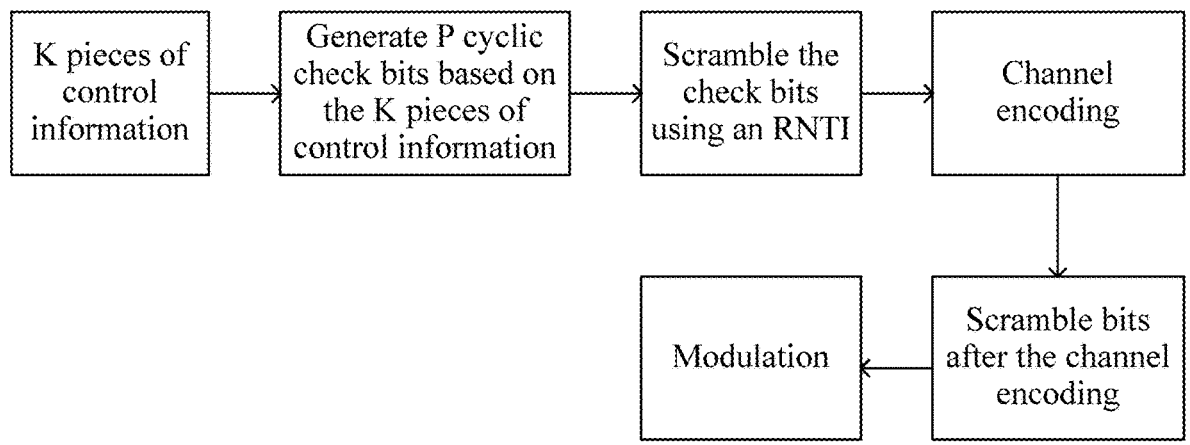
FIG. 16 is a flowchart of control information communication according to an embodiment of the present disclosure.

For example, as shown in FIG. 16, P cyclic redundancy check (CRC) bits are obtained based on K bits of control information, that is, DCI bits, then scrambled, and processed in a channel encoder, and bits after the channel encoding are scrambled and then modulated. If the control information included in the H candidate control channels has the same bits after channel encoding and scrambled differently, or the H candidate control channels have different aggregation levels, the bits after the channel encoding are different. In this case, when processing the H candidate control channels, the terminal needs to separately demodulate and descramble each candidate control channel and then perform soft combining on information in the H candidate control channels after descrambling, which is then processed in a channel decoder, that is, the H candidate control channels are counted as one blind monitoring when the blind monitoring of the control channel is counted. That is, different modulation symbols are transmitted in the H candidate control channels which have no correspondence.

According to an embodiment of the present disclosure, that the H candidate control channels include the same control channel information includes a case where the H candidate control channels include a second type of same control channel information, where the case satisfies at least one of the following characteristics: the control information included in the H candidate control channels before channel encoding has the same bits; the scrambling sequences of the cyclic redundancy check bits for channel encoding of the H candidate control channels are the same; the control information included in the H candidate control channels after channel encoding has the same bits; the H candidate control channels have the same aggregation level; the scrambling sequences of the H candidate control channels after channel encoding are the same; modulation symbols transmitted in the H candidate control channels are the same; or modulation symbols transmitted in subcarriers with a correspondence in the H candidate control channels are the same.

Figure 17:
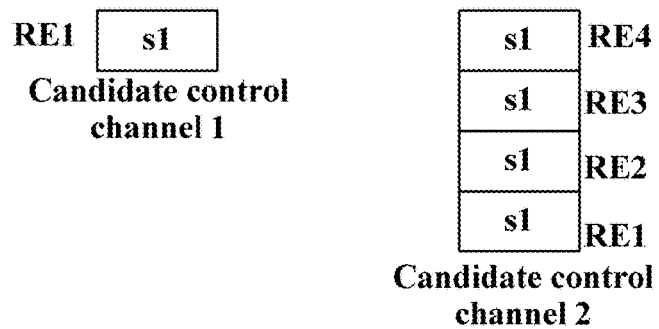
FIG. 17 is a schematic diagram illustrating that the same modulation symbol is transmitted in REs with a correspondence according to an embodiment of the present disclosure.

When processing the H candidate control channels, the terminal may regard multiple subcarriers with a correspondence as different receive antennas, comprehensively demodulate the subcarriers to obtain one demodulation symbol, and perform descrambling once and channel decoding once. Therefore, the H candidate control channels are counted as one blind monitoring when the blind monitoring of the control channel is counted; and/or control channel elements (CCEs) having a correspondence and included in the H candidate control channels are counted as one CCE when the CCE is counted; where the H candidate control channels have the same aggregation level. Another scheme is that a aggregation level of candidate control channel 1 is an integer multiple of a aggregation level of candidate control channel 2; one subcarrier in candidate control channel 2 corresponds to one or more subcarriers in candidate control channel 1, where subcarriers with a correspondence include the same modulation symbol. Candidate control channel 1 and candidate control channel 2 are two candidate control channels among the H candidate control channels. According to an embodiment of the present disclosure, when a channel and coding rate matches, candidate control channel 1 obtains information bits after the channel encoding by using candidate control channel 2 and the same modulation symbol is then placed on multiple subcarriers. As shown in FIG. 17, RE1 in candidate control channel 1 corresponds to {RE1, RE2, RE3, RE4} in candidate control channel 2, all of which transmit the same modulation symbol s1.

According to an embodiment of the present disclosure, that the H candidate control channels include the same control channel information includes a case where the H candidate control channels include a third type of same control channel information, where the third type of same control channel information satisfies at least one of the following characteristics: the H control channel elements include the same information bits; the H control channel elements include different indication information; or at least two of the H control channel elements correspond to different mapping tables between information bit fields and indication information.

According to an embodiment of the present disclosure, the base station (such as the TRP) and the terminal agree that H SSS/SS/CORESET/SSS occasion/SS occasions are repeated transmissions, that is, the same control channel information is transmitted in the H SSS/SS/CORESETs.

According to an embodiment of the present disclosure, the same control channel modulation symbol is transmitted in subcarriers with a correspondence in the H SSS/SS/CORESET/SSS occasion/SS occasions.

Figure 18:
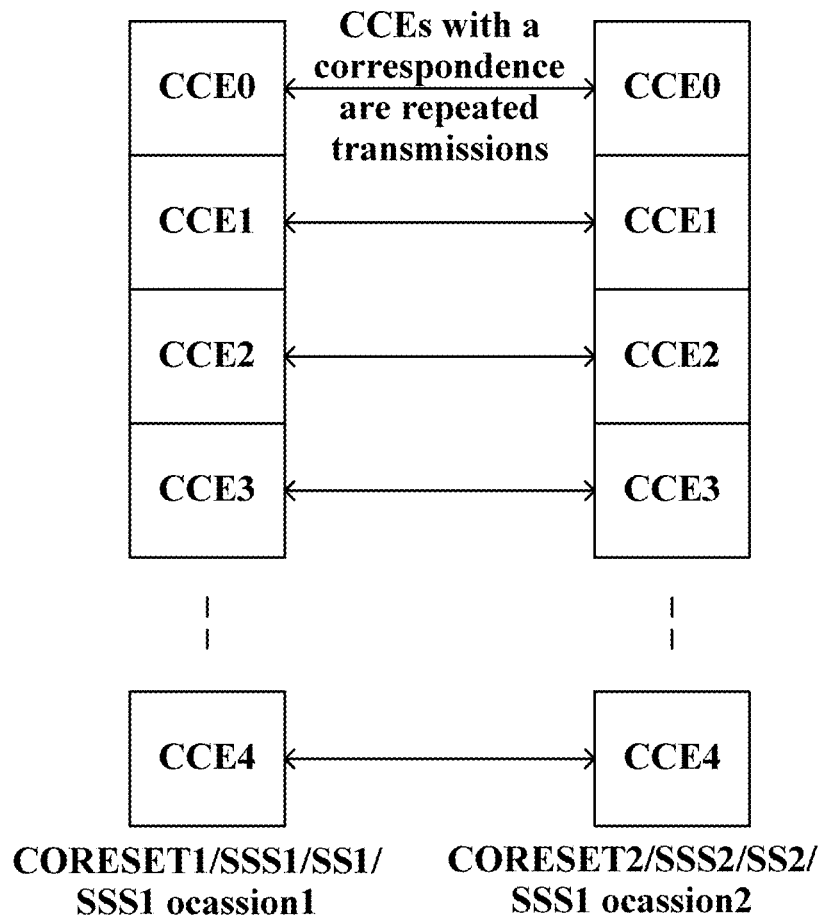
FIG. 18 is a schematic diagram illustrating that the same modulation symbol is transmitted in REs in different candidate control channels according to an embodiment of the present disclosure.

In an optional implementation, as shown in FIG. 18, the H SSS/SS/CORESET/SSS occasion/SS occasions each include the same number of subcarriers/CCEs, indexes of the CCEs are in one-to-one correspondence, and corresponding subcarriers in CCEs with a correspondence include the same modulation symbol.

Figure 19:
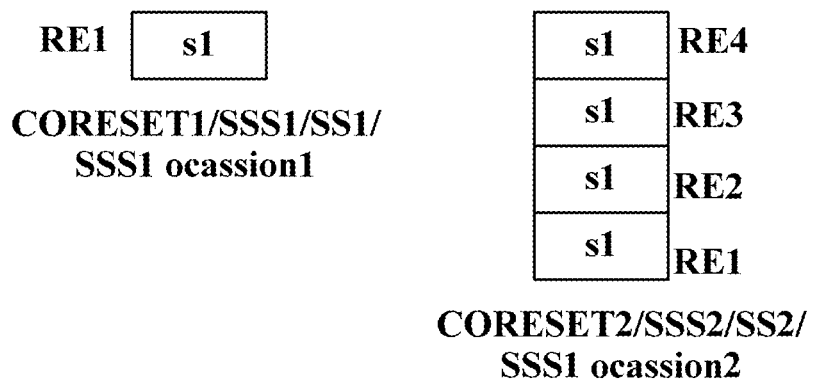
FIG. 19 is a schematic diagram illustrating that corresponding subcarriers in CCEs with a correspondence include the same modulation symbol according to an embodiment of the present disclosure.

In another optional implementation, as shown in FIG. 19, the H SSS/SS/CORESET/SSS occasion/SS occasions include subcarriers/CCEs whose numbers are related by a factor, one subcarrier/CCE in one SSS/SS/CORESET/SSS occasion/SS occasion corresponds to multiple subcarriers/CCEs in another SSS/SS/CORESET/SSS occasion/SS occasion, and corresponding subcarriers in CCEs with a correspondence include the same modulation symbol.

Alternatively, REs with a correspondence in multiple SSS/SS/CORESET/SSS occasion/SS occasions transmit the same bits after channel encoding, where the bits are scrambled differently, so that modulation symbols are different. For example, two REs with a correspondence transmit the same bits {00} after channel encoding, which are scrambled differently. A scrambling sequence of an RE in a first SSS/SS/CORESET/SSS occasion/SS occasion is {01}, and a sequence after scrambling is {01}. A scrambling sequence of an RE in a second SSS/SS/CORESET/SSS occasion/SS occasion is {11}, and a sequence after scrambling is {11}. Therefore, modulation symbols transmitted in the two REs are different, but the REs in the two SSS/SS/CORESET/SSS occasion/SS occasions still have the correspondence and the REs with the correspondence transmit the same bit sequence before channel scrambling.

According to an embodiment of the present disclosure, since an initialization parameter of a scrambling sequence of a bit of a control channel after the channel encoding is obtained according to $c_{init}=(n_{RNTI} \cdot 2^{16}+n_{ID}) \mod 2^{31}$ where $n_{ID}$ is a parameter configured by a higher layer for a UE and $n_{ID} \in \{0, 1, \ldots, 1023\}$; or $n_{ID}$ a physical cell ID and is independently configured for each CORESET. To make the same modulation symbol be transmitted in two CORESETs, the two CORESETs need to have the same $n_{ID}$.

According to an embodiment of the present disclosure, a maximum interval between resources occupied by the H control channel elements including the same control channel information needs to satisfy a predetermined condition, where the resources include time domain resources and/or frequency domain resources. This limitation is mainly intended to control a channel decoding delay and the complexity and power consumption of the terminal.

According to an embodiment of the present disclosure, one control channel element may include one or more quasi co-location resource groups in the frequency domain; and/or one control channel element includes one or more quasi co-location resource groups in the time domain.

According to an embodiment of the present disclosure, one control channel element includes one of one CORESET/ one SSS/one SS/one time domain occasion of one SSS/one time domain occasion of one SS.

The division of quasi co-location resource groups is obtained according to the signaling information or the agreed rule. Multiple quasi co-location resource groups included in one control channel element may include different numbers of subcarriers. Each quasi co-location resource group is associated with one quasi co-location reference signal set, where channels and/or signals in one quasi co-location resource group satisfy the quasi co-location relationship with respect to the first type of quasi co-location parameters and channels and/or signals in different quasi co-location resource groups do not satisfy the quasi co-location relationship with respect to the second type of quasi co-location parameters.

The number of quasi co-location resource groups included in one control channel element is associated with at least one of the following information: the number R of repeated transmissions of one information element, information about a demodulation reference signal of the one information element, or information about a quasi co-location reference signal of the one information element. The information element is the control channel element and similarly, may be a signal such as a reference signal or a synchronization signal.

According to an embodiment of the present disclosure, an example in which two codewords include repeated transmissions of the same information block is used for description. An initialization value of a scrambling sequence of a data channel, the PDSCH, is obtained according to Equation (3), where RNTI is an RNTI range corresponding to a scrambling sequence of a control information cyclic redundancy bit of DCI for scheduling the PDSCH and is UE-Specific, $q \in \{0,1\}$ is a codeword index, and $n_{ID}$ is the parameter configured by the higher layer for the UE or the physical cell ID.

$$c_{init}=n_{RNTI} \cdot 2^{15}+q \cdot 2^{14}+n_{ID} \qquad (3).$$

When two codewords scheduled in one piece of DCI correspond to repeated transmissions of one PDSCH, corresponding REs in the two codewords transmit the same modulation symbol so as to combine the two codewords to be processed when the terminal performs demodulation, that is, obtains the modulation symbol according to a received signal. For this reason, it needs to be specified that when the two codewords include the same control information, the two codewords have the same codeword index q. For example, q is specified to be 0.

According to an embodiment of the present disclosure, the two codewords have the same q only when an agreed condition is satisfied. The agreed condition includes, but is not limited to, at least one of the following: the same modulation and coding rate is used for repeated transmissions of one transmission block, the same redundancy version is used for repeated transmissions of one transmission block, multiple repeated transmissions are scheduled by one control channel, or an interval between resources occupied by multiple repeated transmissions satisfies a predetermined characteristic. For example, a maximum interval between time domain resources occupied by multiple repeated transmissions does not exceed a predetermined value or a maximum interval between time domain resources occupied by multiple repeated transmissions does not exceed a predetermined value and an interval between occupied frequency domain resources does not exceed a predetermined value.

Figure 20:
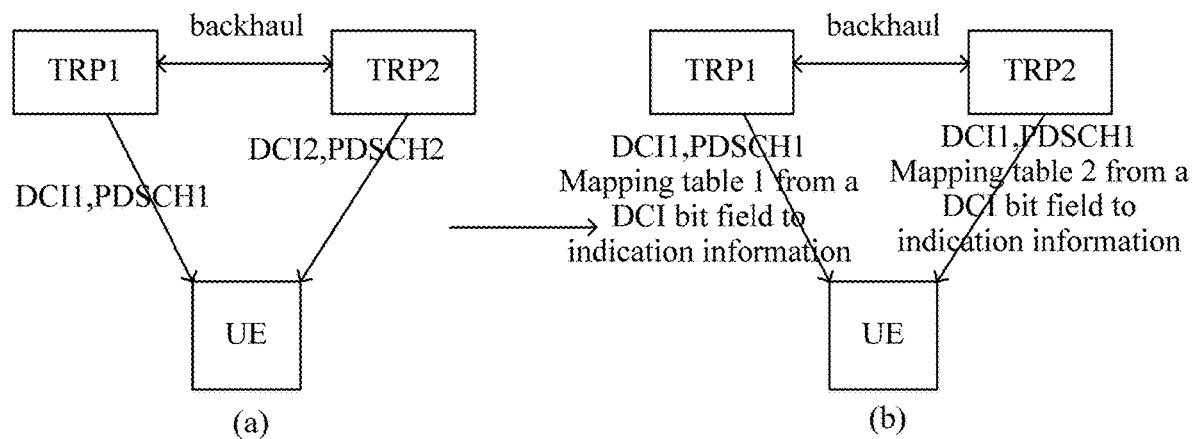
FIG. 20 is a schematic diagram illustrating that one DCI information bit corresponds to two mapping tables from bit field values to indication information according to an embodiment of the present disclosure.

According to an embodiment of the present disclosure, as shown in FIG. 20, TRP0 transmits (DCI1, PDSCH1, DMRS0) and TRP1 transmits (DCI2, PDSCH2, DMRS2), where DCIi schedules PDSCHi and i=1, 2. If there is no relationship between DCI1 and DCI2, DCI1 and DCI2 may include different information bits so that the terminal needs to perform the blind monitoring on the two pieces of DCI. To support this scenario, increase the robustness of DCI, and reduce the blind monitoring complexity of the terminal, DCI1 and DC2 may include the same information bit field and the same bit fields in DCI1 and DC2 include different mapping tables from bit field values to indication information.

For example, the number of bits included in a DMRS information bit indication field included in DCI is 2, and a correspondence between bit field values and indication information is shown in Table 2. If both DCI1 and DCI2 use the mapping relationship in Table 2, a DMRS bit field value in DCI1 is 3, and a DMRS bit field value in DCI1 is 6, the two pieces of DCI include different bit values so that the terminal needs to perform blind monitoring two times. However, the mapping tables corresponding to DCI1 and DCI2 may be different. For example, DCI1 corresponds to Table 2 and DCI2 corresponds to Table 3 so that the DMRS information bit fields in DCI1 and DCI2 are both 3. The terminal jointly decodes DCI1 transmitted in two candidate control channels (respectively corresponding to two TRPs, as shown by (b) in FIG. 20) and then obtains TRP1 information corresponding to TRP1 and DCI2 corresponding to TRP2 by using Table 2 and Table 3, respectively, as shown by (a) in FIG. 20.

TABLE 2

One Codeword: Codeword 0: enabled, Codeword 1: disabled

| Bit Field Value | Indication Information 1: Number of DMRS CDM Groups without Data | Indication information 2: DMRS Port Index |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 3

One Codeword: Codeword 0: enabled, Codeword 1: disabled

| Bit Field Value | Indication Information 1: Number of DMRS CDM Groups without Data | Indication information 2: DMRS Port Index |
|---|---|---|
| 0 | 1 | 2 |
| 1 | 1 | 3 |
| 2 | 1 | 2, 3 |
| 3 | 2 | 2 |
| 4 | 2 | 3 |
| 5 | 2 | 0 |
| 6 | 2 | 1 |
| 7 | 2 | 2, 3 |
| 8 | 2 | 0, 1 |
| 9 | 2 | 0-2 |
| 10 | 2 | 0-3 |
| 11 | 2 | 1, 3 |
| 12-15 | Reserved | Reserved |

According to an embodiment of the present disclosure, if TRP1 and TRP2 do not always send DCI simultaneously and one of TRP1 or TRP2 may send DCI, which one of the following cases {(case 1: TRP1 sends DCI1 and PDSCH1 in FIG. 20 (*b*)), (case 2: TRP2 sends DCI1 and PDSCH2 in FIG. 20 (*b*)), (case 3: TRP1 sends DCI1 and PDSCH1 in FIG. 20 (*b*) and TRP2 sends DCI1 and PDSCH2 in FIG. 20 (*b*))} is it? One scheme is that the terminal performs a blind monitoring on DCI1 in candidate control channel 1 and performs a blind monitoring on DCI1 in candidate control channel 2. The bind monitoring is jointly performed on DCI1 in candidate control channel 1 and candidate control channel 2, so as to know which one of the above cases it is. Alternatively, the terminal assumes that it is always case 3, but PDSCH2 cannot be monitored in case 1 and NACK is fed back for PDSCH2, and PDSCH1 cannot be monitored in case 2 and NACK is fed back for PDSCH1. In another scheme, one bit field in DCI1 in FIG. 20 (*b*) is used for indicating which one of the three cases it is currently. In case 1, the terminal interprets the bit field value in DCI1 by only using Table 2. In case 2, the terminal interprets the bit field value in DCI1 by only using Table 3. In case 3, the terminal interprets the bit field value in DCI1 by using Table 2 and Table 3.

In the above schemes, two mapping tables, Table 2 and Table 3, are established. In another scheme, one mapping table is established. The port index in the table is considered as a relative index of a port in a port set, it is notified via higher-layer signaling that a DMRS port set corresponding to candidate control channel 1 (or SSS1/SS1/CORESET1 where candidate control channel 1 is located) is 10, 1, 2, 31, and it is notified via the higher-layer signaling that a DMRS port set corresponding to candidate control channel 2 (or SSS2/SS2/CORESET2 where candidate control channel 2 is located) is {2, 3, 1, 0}. When indication information in DCI is 0, the corresponding DMRS port is 2, which is actually equivalent to two mapping tables. In this case, although one mapping table is used, the mapping relationship from bit field values to indication information is changed via the higher-layer signaling, which is actually equivalent to two mapping tables. This case is also referred to as two mapping relationship tables.

According to an embodiment of the present disclosure, it may be specified that when the number of DMRS layers is less than 3, it is notified via the higher-layer signaling that the DMRS port set corresponding to candidate control channel 2 (or SSS2/SS2/CORESET2 where candidate control channel 2 is located) is {2, 3, 1, 0}, and when the number of DMRS layers is greater than 2, it is notified via the higher-layer signaling that the DMRS port set corresponding to candidate control channel 2 (or SSS2/SS2/CORESET2 where candidate control channel 2 is located) is {1, 0, 3, 2}.

A DMRS indication field in DCI is used as an example. Similarly, one piece of DCI corresponds to mapping tables between multiple bit fields and indication information. The bit fields may be one or more of a demodulation reference signal information bit field, a transmission configuration information (TCI) bit field, a process number information bit field, or a code block group (CBG) bit field. Of course, the bit fields may be other bit fields. The TCI bit field is used for configuring the quasi co-location reference signal set of PDSCH.

According to an embodiment of the present disclosure, one PDSCH may include more than one quasi co-location resource group in the time domain and/or the frequency domain, where each quasi co-location resource group corresponds to the quasi co-location reference signal set, one DMRS port group satisfies the quasi co-location relationship in one quasi co-location resource group, and one DMRS port group does not satisfy the quasi co-location relationship with respect to one type of quasi co-location parameters in different quasi co-location resource groups.

One or more of the number R of repeated transmissions of the PDSCH, information about a demodulation reference signal of the PDSCH, or information about a quasi co-location reference signal of the PDSCH are related to the division of the quasi co-location resource groups included in one PDSCH and/or the number of the quasi co-location resource groups included in one PDSCH.

Figure 21:
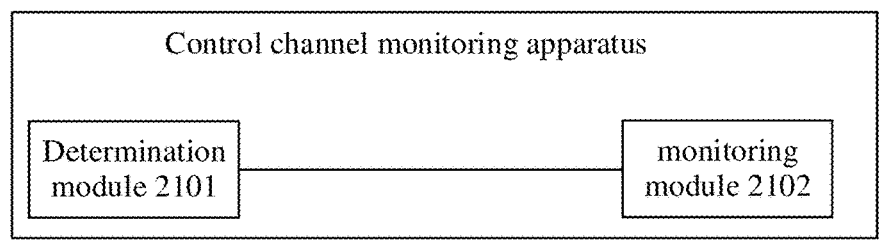
FIG. 21 is a structure diagram of a control channel monitoring apparatus according to an embodiment of the present disclosure.

An embodiment of the present disclosure further provides a control channel monitoring apparatus which may be disposed in a communication node device. As shown in FIG. 21, the control channel monitoring apparatus may include a determination module 2101 and a monitoring module 2102.

According to an embodiment of the present disclosure, the determining module 2101 is configured to determine, according to signaling information and/or a preset rule, whether H first-type control channel elements include the same control channel information, where H is a positive integer greater than or equal to 2.

According to the embodiment of the present disclosure, whether the H first-type control channel elements include the same control channel information is determined according to the signaling information, or whether the H first-type control channel elements include the same control channel information is determined according to the preset rule, or whether the H first-type control channel elements include the same control channel information is determined according to the signaling information in conjunction with the preset rule, which may be flexibly performed according to specific application requirements. Moreover, in this embodiment, a specific value of H, that is, the number of the first-type control channel elements, may also be flexibly determined.

According to an embodiment of the present disclosure, the value of H may be associated with information about an information format of the control channel information. However, it is to be understood that the value of H may, without limitation, be associated with the information about the information format of the control channel information.

According to an embodiment of the present disclosure, the signaling information may be signaling information exchanged between communication node devices, and the preset rule may be a preset rule that may be predetermined or otherwise configured between the communication node devices.

According to an embodiment of the present disclosure, the monitoring module 2102 is configured to monitor a control channel according to a determination result.

According to an embodiment of the present disclosure, when the determination result of the determination module 2101 is that the same control channel information is included, the monitoring module 2102 may perform soft combining on two first-type control channel elements. When the determination result of the determination module 2101 is that transmitted control channels after channel encoding have the same bits, the monitoring module 2102 may also perform combining before demodulation, thereby reducing the monitoring complexity of the communication node device.

According to an embodiment of the present disclosure, when the determination result of the determination module 2101 is that different control channel information is included, the monitoring module 2102 may monitor the first-type control channel elements separately and perform channel decoding a corresponding number of times.

According to an embodiment of the present disclosure, the operation in which the determination module 2101 determines, according to the signaling information and/or the preset rule, whether the H first-type control channel elements include the same control channel information satisfies at least one of characteristics described below, which is not limited thereto. In the case where a first-type parameter(s) of the H first-type control channel elements satisfies a first-type preset condition, the H first-type control channel elements include the same control channel information. In the case where the H first-type control channel elements include the same control channel information, a configuration of parameter(s) of a second type of C second-type control channel elements where the H first-type control channel elements are located needs to satisfy a second-type preset condition. In the case where the H first-type control channel elements include the same control channel information, a configuration of parameter(s) of a third type of the H first-type control channel elements needs to satisfy a third-type preset condition. H1 fourth-type control channel elements are configured in one third-type control channel element, and first-type control channel elements belonging to different fourth-type control channel elements in the one third control channel element include the same control channel information. First-type control channel elements belonging to different fourth-type control channel elements in a group of fourth-type control channel elements include the same control channel information. Alternatively, H3 sets of first information are activated for a control channel demodulation reference signal port, and first-type control channel elements belonging to different sets of first information include the same control channel information, where H3 is a positive integer greater than or equal to 2. C is a positive integer greater than or equal to 1, and resources where the first-type control channel elements are located belong to one or more second-type control channel elements.

According to an embodiment of the present disclosure, in the case where the H first-type control channel elements include the same control channel information, the H first-type control channel elements may satisfy at least one of characteristics described below, which is not limited thereto. The H first-type control channel elements belong to the H1 fourth-type control channel elements. A correspondence exists between fifth-type control channel elements included in the H first-type control channel elements. Demodulation reference signals of at least two of the H first-type control channel elements do not satisfy a quasi co-location relationship with respect to one type of quasi co-location parameters. A minimum value of the number of quasi co-location reference signal sets in a set composed of quasi co-location reference signal sets of all of the H first-type control channel elements exceeds a predetermined threshold of the number of sets. The number of different sequences of the H first-type control channel elements does not exceed a predetermined threshold of the number of sequences, where each of the different sequences includes at least one of a scrambling sequence of bits of a control channel after channel encoding, a demodulation reference signal sequence of a control channel, or a scrambling sequence of a cyclic redundancy check (CRC) bit for channel encoding of a control channel. Demodulation reference signals of the H first-type control channel elements have the same quasi co-location reference signal with respect to a spatial receive filtering parameter. Group information associated with quasi co-location reference signals of demodulation reference signals of the H first-type control channel elements with respect to a spatial receive filtering parameter satisfies a preset group information condition. A maximum interval between resources occupied by the H first-type control channel elements does not exceed a preset first interval threshold. A maximum interval between resources occupied by different first-type control channel elements of the H first-type control channel elements does not exceed a preset second interval threshold. Alternatively, the number of frequency domain bandwidths in a frequency domain bandwidth set composed of frequency domain bandwidths where the H first-type control channel elements are located does not exceed a preset threshold of the number of bandwidths. Each of the resources includes a time domain resource and/or a frequency domain resource. H1 is a positive integer greater than or equal to 1 and/or H is an integer multiple of H1. Each of the first-type control channel elements includes one or more fifth-type control channel resources.

According to an embodiment of the present disclosure, in the case where the H first-type control channel elements include the same control channel information, the H first-type control channel elements satisfy at least one of characteristics described below, which is not limited thereto. The H first-type control channel elements belong to the H1 fourth-type control channel elements. In the case where the first-type control channel elements are candidate control channels, the number of times blind monitoring corresponding to the H candidate control channels is performed is not equal to H. A correspondence exists between fifth-type control channel elements included in two of the H first-type control channel elements. The demodulation reference signals of at least two of the H first-type control channel elements do not satisfy the quasi co-location relationship with respect to the one type of quasi co-location parameters. A minimum value of the number of different quasi co-location reference signal sets in the set composed of the quasi co-location reference signal sets of all of the H first-type control channel elements exceeds a first predetermined value. The number of different sequences of the H first-type control channel elements does not exceed a second predetermined value, where each of the different sequences includes at least one of the scrambling sequence of the bits of the control channel after channel encoding, the demodulation reference signal sequence of the control channel, or the scrambling sequence of the cyclic redundancy check (CRC) bit for channel encoding of the control channel. The demodulation reference signals of the H first-type control channel elements have the same quasi co-location reference signal with respect to the spatial receive filtering parameter. The group information associated with the quasi co-location reference signals of the demodulation reference signals of the H first-type control channel elements with respect to the spatial receive filtering parameter satisfies the preset group information condition. The maximum interval between the resources occupied by the H first-type control channel elements does not exceed a preset third predetermined value. The maximum interval between the resources occupied by the different first-type control channel elements of the H first-type control channel elements does not exceed a preset fourth predetermined value. The number of frequency domain bandwidths in the frequency domain bandwidth set composed of the frequency domain bandwidths where the H first-type control channel elements are located does not exceed a fifth predetermined value. Alternatively, the value of H is associated with the information about the information format of the control channel information. Each of the resources includes the time domain resource and/or the frequency domain resource. H1 is a positive integer greater than or equal to 1 and/or H is an integer multiple of H1. Each of the first-type control channel elements includes one or more fifth-type control channel resources.

According to an embodiment of the present disclosure, the fourth-type control channel elements satisfy at least one of characteristics described below, which is not limited thereto. The H1 fourth-type control channel elements are associated with an index of one third control channel element. The H1 fourth-type control channel elements belong to one or more groups of fourth-type control channel elements. Frequency domain bandwidths where at least two of the fil fourth-type control channel elements are located have different indexes, where each of the frequency domain bandwidths includes a frequency domain bandwidth corresponding to a component carrier and/or a frequency domain bandwidth corresponding to a bandwidth part. Each of the H1 fourth-type control channel elements includes one or more of the H first-type control channel elements. The H first-type control channel elements are allocated in the H1 fourth-type control channel elements according to a preset proportion. Each of the H1 fourth-type control channel elements is associated with one quasi co-location reference signal set. Channels and/or signals in one of the fourth-type control channel elements satisfy a quasi co-location relationship. Channels and/or signals in at least two of the H1 fourth-type control channel elements do not satisfy a quasi co-location relationship with respect to one type of quasi co-location parameters. parameter(s) of a second type of the H1 fourth-type control channel elements satisfies the second-type preset condition. A maximum interval between resources occupied by the H1 fourth-type control channel elements does not exceed a preset sixth predetermined value. A maximum interval between resources occupied by different fourth-type control channel elements of the H1 fourth-type control channel elements does not exceed a preset seventh predetermined value. A resource where one of the first-type control channel elements is located is unable to belong to more than one fourth-type control channel element. Resources included in one precoding resource group are unable to belong to more than one fourth-type control channel element. The number of times blind monitoring of a control channel corresponding to the H1 fourth-type control channel elements is performed is different from the number of candidate control channels included in the H1 fourth-type control channel elements. Alternatively, in the case where the fourth-type control channel elements are quasi co-location resource groups, one of the quasi co-location resource groups includes an integer multiple of consecutive frequency domain groups in frequency domain, or resources included in the one of the quasi co-location resource groups in frequency domain do not belong to more than one consecutive frequency domain group, where one consecutive frequency domain group is one consecutive resource block group included in a control resource set where the one of the quasi co-location resource groups is located. Each of the fourth-type control channel elements includes one of: one control channel search space, one control channel search space set, one time domain occasion of one control channel search space set, one time domain occasion of one control channel search space, one control resource set, one candidate control channel, one piece of transmission configuration information (TCI), one control channel quasi co-location resource group, or one control channel demodulation reference signal group.

According to an embodiment of the present disclosure, specific values of the above predetermined values may be flexibly set. For example, in an example embodiment, at least one of the first predetermined value, the second predetermined value, the third predetermined value, the fourth predetermined value, the fifth predetermined value, the sixth predetermined value, or the seventh predetermined value is obtained according to the signaling information and/or capability information reported by a communication node or in other manners. The communication node is a communication node that monitors the first-type control channel elements.

According to an embodiment of the present disclosure, the first information may, without limitation, be used for indicating at least one of the following information: a quasi co-location reference signal set; a phase tracking reference signal; a scrambling sequence generation parameter of bits of control channel information after channel encoding; a scrambling sequence generation parameter of a cyclic redundancy check bit for channel encoding of control channel information; or a sequence generation parameter of a demodulation reference signal of a control channel.

According to an embodiment of the present disclosure, the one third-type control channel element does, without limitation, satisfy at least one of the following characteristics: one control channel search space set, one control channel search space, one time domain occasion of one control channel search space set, or one time domain occasion of one control channel search space.

According to an embodiment of the present disclosure, the first-type parameter and/or the third-type of parameter may include, but are not limited to, at least one of the following parameters: indexes of the first-type control channel elements; indexes of the second-type control channel elements where the first-type control channel elements are located; a minimum index among indexes of the second-type control channel elements where the first-type control channel elements are located; a quasi co-location reference signal set of the first-type control channel elements; a resource mapping manner of the second-type control channel elements where the first-type control channel elements are located, where the resource mapping manner includes one or more of a mapping manner from control channel elements (CCEs) to resource element groups (REGs) or a mapping manner from first-type control channel elements to CCEs; time domain resources of the first-type control channel elements; frequency domain resources of the first-type control channel elements; the number of fifth-type control channel elements included in each of the first-type control channel elements, where each of the first-type control channel elements includes one or more fifth-type control channel elements; a sequence generation parameter of the first-type control channel elements, where a sequence includes at least one of the scrambling sequence of the bits of the control channel after channel encoding, the demodulation reference signal sequence of the control channel, or the scrambling sequence of the CRC bit for channel encoding of the control channel; a demodulation reference signal of the first-type control channel elements; a aggregation level of the first-type control channel elements; group information of the first-type control channel elements; or an index of a serving cell of the first-type control channel elements. In an example, the index of the serving cell may be used for a mapping from first-type control channel elements to CCEs, or the index of the serving cell is included in one piece of control channel information. The resources where the first-type control channel elements are located belong to one or more second-type control channel elements.

According to an embodiment of the present disclosure, the group information satisfies one of characteristics described below, which is not limited thereto. The group information is information about a group to which the second-type control channel elements where the first-type control channel elements are located belong, where one group includes one or more second-type control channel elements, and one second-type control channel element includes one or more first-type control channel elements. The group information is information about a group to which the first-type control channel elements belong, where one group includes one or more first-type control channel elements. In the case where two first-type control channel elements have the same group information, the two first-type control channel elements include the same control channel information. Alternatively, in the case where two first-type control channel elements have different group information, the two first-type control channel elements include different control channel information.

According to an embodiment of the present disclosure, the group information may also satisfy at least one of characteristics described below, which is not limited thereto. In the case where two first-type control channel elements have the same group information, the two first-type control channel elements include different control channel information. Alternatively, in the case where two first-type control channel elements have different group information, the two first-type control channel elements include the same control channel information.

According to an embodiment of the present disclosure, the above two first-type control channel elements may be any two of the H first-type control channel elements.

According to an embodiment of the present disclosure, the second-type of parameter includes at least one of the following parameters of the second-type control channel elements: a time domain resource; a frequency domain resource; a resource mapping manner from CCEs to first-type control channel elements; a mapping manner from CCEs to precoding resource groups; a mapping manner from first-type control channel elements to CCEs; a parameter of a precoding resource group; information about a demodulation reference signal; configuration information of a quasi co-location reference signal set; a sequence generation parameter of a control channel in the control channel elements, where a sequence includes at least one of the scrambling sequence of the bits of the control channel after channel encoding, the demodulation reference signal sequence of the control channel, or a scrambling sequence of CRC for channel encoding of the control channel; or the number of seventh-type control channel elements included in a sixth-type control channel element. The sixth-type control channel element includes one or more seventh-type control channel elements, and each of the second-type control channel elements includes one or more sixth-type control channel elements.

According to an embodiment of the present disclosure, at least one of the first-type preset condition, the second-type preset condition, or the third-type preset condition includes, but is not limited to, at least one of conditions described below. Two parameters have the same value. A difference between values of two parameters satisfies a fourth-type preset condition, which is not limited thereto, where the fourth-type preset condition includes the following: the difference is equal to a preset value, the difference belongs to a preset range, and a minimum interval of the difference is greater than a preset eighth predetermined value. A combination of values of two parameters belongs to a preset set. Two parameters have different values. An intersection set of values of two parameters satisfies a fifth-type preset condition, which is not limited thereto, where the fifth-type preset condition includes one of the following: the intersection set is empty, the intersection set is non-empty, the number of elements included in the intersection set is not less than a preset value, or the number of elements included in the intersection set is not greater than a preset value. A difference set of values of two parameters satisfies a sixth-type preset condition, which is not limited thereto, where the sixth-type preset condition includes the following: the difference set is empty, the difference set is non-empty, the number of elements included in the difference set is not less than a preset value, or the number of elements included in the difference set is not greater than a preset value. A maximum value of the number of different values of H parameters is unable to exceed an agreed threshold. A maximum difference between any two parameters of H parameters is unable to exceed a predetermined threshold. Alternatively, an intersection set of H parameters satisfies a fifth-type preset condition, which is not limited thereto. The two parameters are parameters of two of the H first-type control channel elements or parameters of two second-type control channel elements where two of the H first-type control channel elements are located. The H parameters are H parameters of the H first-type control channel elements or H parameters of H second-type control channel elements where the H first-type control channel elements are located.

According to an embodiment of the present disclosure, a first parameter does, without limitation, satisfy a first preset condition, and a second parameter does, without limitation, satisfy a second preset condition, where the first parameter and the second parameter belong to a fourth type of parameters, and the first preset condition and the second preset condition belong to the fourth-type preset condition; or different parameters among a fourth type of parameters need, without limitation, satisfy different fourth-type preset conditions. The fourth type of parameters may be, but is not limited to, one of the first-type parameter, the second-type parameter, or the third-type parameter. The fourth-type preset condition is one of the first-type preset condition, the second-type preset condition, or the third-type preset condition.

According to an embodiment of the present disclosure, a maximum value of the number of first-type control channel elements including the same control channel information, which are successfully monitored by the communication node, of the H first-type control channel elements is a predetermined value, where the maximum value is less than or equal to H; and/or the number of first-type control channel elements including the same control channel information, which are successfully monitored by the communication node, of the H first-type control channel elements is associated with information about time where the first-type control channel elements are located; and/or the communication node assumes that the H first-type control channel elements include the same control channel information. That is, in an example embodiment, the communication node device may firstly assume that the H first-type control channel elements include the same control channel information when performing a monitoring and then determine the number of first-type control channel elements including the same control channel information and successfully monitored based on a specific monitoring result, where the number must be less than or equal to H.

According to an embodiment of the present disclosure, the H first-type control channel elements are counted as one blind monitoring when the blind monitoring of the control channel is counted; and/or control channel elements (CCEs) having a correspondence and included in the H first-type control channel elements are counted as one CCE when the CCE is counted.

According to an embodiment of the present disclosure, in the case where the H first-type control channel elements include the same control channel information, a table of a mapping relationship between a value of an information bit field in the same control channel information and indication information is determined according to the second-type control channel element where the first-type control channel elements are located.

According to an embodiment of the present disclosure, a correspondence exists between an index of the second-type control channel element and the table of the mapping relationship; and/or the table of the mapping relationship is configured in configuration information of the second-type control channel element; and/or at least two second-type control channel elements correspond to different tables of mapping relationships.

According to an embodiment of the present disclosure, a group of candidate control channels is constituted according to the signaling information and/or an agreed rule. The group of candidate control channels satisfies at least one of characteristics described below, which is not limited thereto. Any two candidate control channels in the group of candidate control channels include the same control channel information. All candidate control channels in the group of candidate control channels include the same control channel information. A receiving end assumes that a sending end sends the same control channel information in at most Z predetermined candidate control channels in the group of candidate control channels. Each candidate control channel in the group of candidate control channels is associated with one piece of third information. The third information includes one or more of an index of a search space set, an index of a search space, an index of a component carrier, index information of a candidate control channel, an index of a time domain occasion of a search space set, an index of a time domain occasion of a search space, or an index of a control resource set. Alternatively, at least two candidate control channels in the group of candidate control channels have different third information.

According to an embodiment of the present disclosure, that the H first-type control channel elements include the same control channel information includes a first-type same case of the control channel information. The first-type same case satisfies at least one of characteristics described below, which is not limited thereto. Control information included in the H first-type control channel elements before channel encoding has the same bits. Scrambling sequences of cyclic shifts for channel encoding of the H first-type control channel elements are the same. Control information included in the H first-type control channel elements after channel encoding has different bits. The H first-type control channel elements have different aggregation levels. Scrambling sequences of the H first-type control channel elements after channel encoding are different. Alternatively, the H first-type control channel elements are counted as one blind monitoring when the blind monitoring of the control channel is counted.

According to an embodiment of the present disclosure, that the H first-type control channel elements include the same control channel information includes a second-type same case of the control channel information. The second-type case satisfies at least one of characteristics described below, which is not limited thereto. The control information included in the H first-type control channel elements before channel encoding has the same bits. The scrambling sequences of the cyclic shifts for channel encoding of the H first-type control channel elements are the same. The control information included in the H first-type control channel elements after channel encoding has the same bits. A aggregation level of a control channel element 1 is an integer multiple of a aggregation level of a control channel element 2. One subcarrier in a control channel element 2 corresponds to one or more subcarriers in a control channel element 2, where subcarriers with a correspondence include the same modulation symbol. The H first-type control channel elements have the same aggregation level. The scrambling sequences of the H first-type control channel elements after channel encoding are the same. Modulation symbols transmitted in the H first-type control channel elements are the same. Modulation symbols transmitted in subcarriers with a correspondence in the H first-type control channel elements are the same. The H first-type control channel elements are counted as one blind monitoring when the blind monitoring of the control channel is counted. Alternatively, the control channel elements (CCEs) having the correspondence and included in the H first-type control channel elements are counted as one CCE when the CCE is counted. The control channel element 1 and the control channel element 2 are two control channel elements of the first-type control channel elements.

According to an embodiment of the present disclosure, that the H first-type control channel elements include the same control channel information includes a third-type same case of the control channel information. The third-type same case satisfies at least one of characteristics described below, which is not limited thereto. The H control channel elements include the same information bits. The H control channel elements include different indication information. Alternatively, at least two of the H control channel elements correspond to different mapping tables between information bit fields and indication information.

Therefore, in an example, the determination module 2101 may determine, according to the signaling information and/or the agreed rule, whether a type of the same control channel information included in the H first-type control channel elements is, for example, the first type of same control channel information or the second type of same control channel information or the third type of same control channel information. In the case where the H first-type control channel elements including the same control channel information include the second type of same control channel information, a correspondence between fifth-type control channel elements included in any two of the H first-type control channel elements is determined according to the signaling information and/or the agreed rule. In the case where the H first-type control channel elements including the same control channel information include the third type of same control channel information, the same control information included in the H first-type control channel elements includes selection information of a mapping table of the bit field, where the mapping table is in an activated state currently. In the case where the H first-type control channel elements including the same control channel information include the second type of same control channel information, the H first-type control channel elements have one or more of the following same mapping manners: a mapping manner from candidate control channels to CCEs or the mapping manner from CCEs to precoding resource groups.

According to an embodiment of the present disclosure, one or more of the first-type control channel element, the second-type control channel element, or the fifth-type control channel element includes at least one of: the control resource set, the control channel search space set, the control channel search space, the time domain occasion of the control channel search space set, the time domain occasion of the control channel search space, a candidate control channel element, the control channel element (CCE), the quasi co-location resource group, the precoding resource group, a resource element group (REG), a resource element (RE), or information about a control channel demodulation reference signal.

According to an embodiment of the present disclosure, the quasi co-location resource group satisfies at least one of characteristics described below, which is not limited thereto. Channels and/or signals in one quasi co-location resource group have the same quasi co-location reference signal set. Each quasi co-location resource group corresponds to one quasi co-location reference signal set. Channels and/or signals in different quasi co-location resource groups do not satisfy the quasi co-location relationship with respect to one type of quasi co-location parameters, which is not limited thereto. In an example, the one type of quasi co-location parameters includes at least one of a Doppler shift, a Doppler spread, an average delay, a delay spread, a spatial reception parameter, or an average gain. One demodulation reference signal port corresponds to one quasi co-location reference signal set in each quasi co-location resource group. One demodulation reference signal port does not satisfy the quasi co-location relationship with respect to one type of quasi co-location parameters in different quasi co-location resource groups, which is not limited thereto. One sixth-type control channel element includes more than one quasi co-location resource group. An index of a CCE is independently calculated in each quasi co-location resource group in one sixth-type control channel element. One quasi co-location resource group includes k precoding resource groups, where k is a positive integer greater than or equal to 1. A boundary of the quasi co-location resource group coincides with a boundary of the precoding resource group, where the boundary includes a time domain boundary and/or a frequency domain boundary. A resource in one precoding resource group does not belong to more than one quasi co-location resource group. A quasi co-location resource groups are associated with A quasi co-location reference signal sets, and each of the A quasi co-location resource groups is associated with one of the A quasi co-location reference signal sets. Alternatively, a division of the quasi co-location resource group is obtained according to the signaling information and/or the agreed rule. The sixth-type control channel element includes one of the control resource set (CORESET), the control channel search space set, the control channel search space, the time domain occasion of the control channel search space set, the time domain occasion of the control channel search space, or the candidate control channel.

Figure 22:
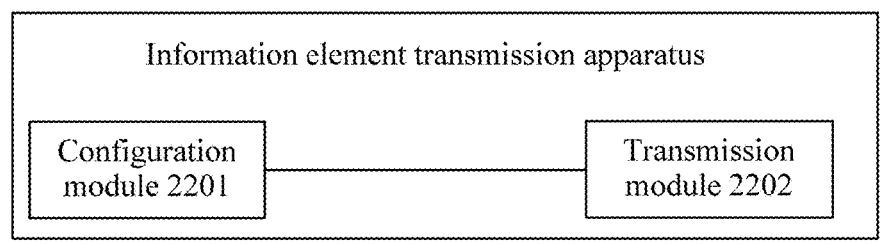
FIG. 22 is a structure diagram of an information element transmission apparatus according to an embodiment of the present disclosure.

An embodiment of the present disclosure further provides an information element transmission apparatus which may also be disposed in a communication node device. As shown in FIG. 22, the information element transmission apparatus may include a configuration 2201 and a transmission module 2202. The configuration module 2201 is configured to associate one information element with N sets of values of parameter(s) of a type. The transmission module 2202 is configured to transmit or monitor the information element or transmit or monitor information in the information element according to the parameter(s) of a type. A transmission includes sending or receiving.

According to an embodiment of the present disclosure, the one information element may be, but is not limited to, at least one of one channel, one signal, one control channel resource element, one data channel codeword, control channel information, or one signal port. N is a positive integer greater than or equal to 1.

According to an embodiment of the present disclosure, the N sets of values may satisfy at least one of characteristics described below, which is not limited thereto. The N sets of values correspond to M repeated transmissions of the information element. The N sets of values correspond to one redundancy version pattern bitmap of the information element, where the redundancy version pattern bitmap includes M redundancy version elements. Alternatively, N has different values or the same value for different types of information elements. M and N satisfy at least one of the following characteristics: M is a positive integer greater than or equal to 2; M=x*N, where x is a positive integer greater than or equal to 1 and x repeated transmissions of the information element correspond to one set of values among the N sets of values; N=x1*M, where x1 is a positive integer greater than or equal to 1 and one transmission of the information element corresponds to x1 sets of values among the N sets of values.

According to an embodiment of the present disclosure, the parameter(s) of a type may include, but is not limited to, at least one of a quasi co-location parameter set, a phase tracking reference signal, a demodulation reference signal sequence, a redundancy version, a time domain resource, a frequency domain resource, a channel scrambling sequence, a control resource set, a precoding resource group, information about a quasi co-location resource group, or transmission configuration information (TCI). Different parameters among the parameter(s) of a type correspond to the same value or different values of N.

According to an embodiment of the present disclosure, one data channel (that is, the one information element in the embodiment of the present disclosure) is scheduled by N pieces of control channel information (that is, one of the parameter(s) of a type in the embodiment of the present disclosure), and each of the N pieces of control channel information includes information about a transmission parameter of the one data channel.

According to an embodiment of the present disclosure, it may also be set that one demodulation reference signal port (that is, the one information element in the embodiment of the present disclosure) and each of N sets of quasi co-location reference signal sets (that is, one of the parameter(s) of a type in the embodiment of the present disclosure) satisfy a quasi co-location relationship with respect to one type of quasi co-location parameter; a phase deviation of one demodulation reference signal is acquired according to each of N sets of phase tracking reference signals; N sets of demodulation reference signal sequences correspond to N sets of demodulation reference signal sequence generation parameters; and N sets of channel scrambling sequences correspond to N sets of channel scrambling sequence generation parameters. P is a positive integer less than or equal to N.

According to an embodiment of the present disclosure, configuration information of a first parameter among the parameter(s) of a type includes configuration information of a second parameter among the parameter(s) of a type; and/or the N sets of values of the parameter(s) of a type that are associated with one demodulation reference signal correspond to M repeated transmissions of one channel, where an intersection set between resources occupied by different transmissions among the M repeated transmissions of the one channel is non-empty and/or a difference set between resources occupied by different transmissions among the M repeated transmissions of the one channel is empty, and the resources include time domain resources and/or frequency domain resources.

According to an embodiment of the present disclosure, N1 control resource sets (CORESETs) are configured in one control channel search space set; and/or one control channel element is associated with N2 scrambling sequence parameters; and/or the one control channel element is associated with N3 demodulation reference signal ports; and/or the one control channel element is associated with N4 quasi co-location resource groups; where N1, N2, N3, and N4 are positive integers greater than or equal to 1.

According to an embodiment of the present disclosure, that the one control channel element is associated with the N2 scrambling sequence parameters satisfies at least one of characteristics described below, which is not limited thereto. The N2 scrambling sequence parameters are configured for the one control channel element in first control signaling. In an example, an activated scrambling sequence parameter is used by a control channel of control channel resources. One or more of the N2 scrambling sequence parameters is activated for the control channel element in second control signaling. The scrambling sequence parameters include a generation parameter of a scrambling sequence of bits of control information transmitted in the control channel resource element after channel encoding. Alternatively, the scrambling sequence parameters include a generation parameter of a demodulation reference signal sequence of a control channel transmitted in the control channel resource element. The first control signaling is radio resource control (RRC) signaling and the second control signaling is a MAC-CE command; or the first control signaling is RRC signaling and the second control signaling is a downlink control information (DCI) command; or the first control signaling is MAC-CE signaling and the second control signaling is a DCI command.

According to an embodiment of the present disclosure, that the one control channel element is associated with the N3 demodulation reference signal ports satisfies at least one of characteristics described below, which is not limited thereto. The N3 demodulation reference signal ports include a first port and a second port that are orthogonal. Alternatively, the N3 demodulation reference signal ports include a third port and a fourth port that do, without limitation, satisfy at least one of the following characteristics: the third port and the fourth port are pseudo-orthogonal, the third port and the fourth port correspond to different demodulation reference signal sequences, or the third port and the fourth port correspond to the same index of a demodulation reference signal port. In an example embodiment, different demodulation reference signal sequences are PN sequences or ZC sequences.

A time-frequency resource corresponding to the N3 demodulation reference signal ports includes N3 repeated transmissions of one piece of control information. That is, in an example embodiment, one control channel is repeatedly transmitted in channel resources corresponding to N3 demodulation reference signals. For example, a transmit diversity manner is used or the complete information of the one control channel is transmitted in a channel resource corresponding to each demodulation reference signal, where channel decoding may be performed independently. Alternatively, different channel encoding redundancy versions of one piece of control channel information are transmitted in channel resources corresponding to different demodulation reference signals.

According to an embodiment of the present disclosure, one data channel is scheduled by N control channels, and each of the N control channels includes information about a transmission parameter of the one data channel.

According to an embodiment of the present disclosure, the information element is associated with N quasi co-location resource groups, where each of the N quasi co-location resource groups includes k precoding resource groups, and k is a positive integer greater than or equal to 1.

According to an embodiment of the present disclosure, the M repeated transmissions of the information element are associated with N sets of transmission parameters, where a predetermined transmission parameter of the transmission parameters uses one set of the N sets of values for the M repeated transmissions. Alternatively, the M repeated transmissions of the information element are associated with N sets of transmission parameters, where in the case where a predetermined condition is, without limitation, satisfied, a predetermined transmission parameter of the transmission parameters uses one set of the N sets of values for the M repeated transmissions. For example, in an example embodiment, the information element is a transmission block; and/or each of the transmission parameters includes one or more of a modulation and coding rate, a redundancy version, a codeword index, or a channel scrambling sequence parameter; and/or the predetermined transmission parameter includes one or more of the codeword index, the channel scrambling sequence parameter, or the modulation and coding rate; and/or the predetermined condition includes one or more of the following conditions: the same modulation and coding rate is used for repeated transmissions of the transmission block, the same redundancy version is used for repeated transmissions of the transmission block, the M repeated transmissions are scheduled by one control channel, or an interval between resources occupied by the M repeated transmissions satisfies a predetermined characteristic, which is not limited thereto.

According to an embodiment of the present disclosure, one bit field in one piece of control information is associated with N mapping tables, where the mapping tables are mapping relationships between bit field values and indication information; and/or N channels are scheduled by one piece of control information.

According to an embodiment of the present disclosure, the N mapping tables correspond to the N channels, respectively; and/or the N channels have different transmission parameters; and/or the bit field includes at least one of a demodulation reference signal information bit field, a TCI bit field, a process number information bit field, or a code block group (CBG) bit field; and/or the N mapping tables correspond to N control channel elements where the one piece of control information is located, respectively; and/or indication information of a transmission of the one piece of control information is obtained according to the one piece of control information and configuration information in the N control channel elements; and/or the one piece of control information includes selection information of a mapping table, which is in an activated state currently, of the one bit field among the N mapping tables. The N control channel elements are the N control channel elements where the one piece of control information is located.

According to an embodiment of the present disclosure, associating the one information element with the N sets of values of the parameter(s) of a type includes that the parameter(s) of a type of the one information element has N sets of activated values. The control channel element includes one of: a control resource set (CORESET), a control channel search space set, a control channel search space, a time domain occasion of a control channel search space set, a time domain occasion of a control channel search space, a candidate control channel element, a control channel element (CCE), a quasi co-location resource group, a precoding resource group, a resource element group (REG), a resource element (RE), or information about a control channel demodulation reference signal.

According to an embodiment of the present disclosure, a value of N or a maximum value of N is determined according to signaling information or a preset rule; and/or the value of N or the maximum value of N is determined according to a type of the information element; and/or the value of N or the maximum value of N is determined according to a value of a parameter among the parameter(s) of a type.

According to an embodiment of the present disclosure, the one information element includes B1 quasi co-location resource groups in frequency domain; and/or the one information element includes B2 quasi co-location resource groups in time domain; and/or the one information element includes B3 precoding resource groups in the time domain.

According to an embodiment of the present disclosure, second information of the one information element may be associated with at least one of B1, B2, B3, or k. The second information includes one or more of the number R of repeated transmissions of the one information element, information about a demodulation reference signal of the one information element, or information about a quasi co-location reference signal of the one information element.

According to an embodiment of the present disclosure, B1, B2, B3, and k may, without limitation, satisfy one of the following characteristics: R is an integer multiple of B1; R is an integer multiple of B2; R is an integer multiple of B3; R is an integer multiple of B1*B2; R is an integer multiple of B1*B2*k; B1 is an integer multiple of R; B2 is an integer multiple of R; B3 is an integer multiple of R; B1*B2 is an integer multiple of R; or B1*B2*k is an integer multiple of R.

According to an embodiment of the present disclosure, at least one of B1, B2, B3, k, or a division of the quasi co-location resource groups may, without limitation, be acquired according to the signaling information or the preset rule.

According to an embodiment of the present disclosure, the quasi co-location resource group satisfies at least one of characteristics described below, which is not limited thereto. Channels and/or signals in one quasi co-location resource group have the same quasi co-location reference signal set. Each quasi co-location resource group corresponds to one quasi co-location reference signal set. Channels and/or signals in different quasi co-location resource groups do not satisfy the quasi co-location relationship with respect to one type of quasi co-location parameters, which is not limited thereto. An index of a CCE is independently calculated in each quasi co-location resource group in the one control channel element. A boundary of the quasi co-location resource group coincides with a boundary of the precoding resource groups, where the boundary includes a time domain boundary and/or a frequency domain boundary. A resource in one precoding resource group does not belong to more than one quasi co-location resource group. A quasi co-location resource groups are associated with A quasi co-location reference signal sets, and each of the A quasi co-location resource groups is associated with one of the A quasi co-location reference signal sets. One demodulation reference signal port corresponds to one quasi co-location reference signal set in each quasi co-location resource group. One demodulation reference signal port does not satisfy the quasi co-location relationship with respect to one type of quasi co-location parameters in different quasi co-location resource groups, which is not limited thereto. A communication node assumes that channels and/or signals in the precoding resource group have the same precoding. Alternatively, a communication node assumes that channels and/or signals in different precoding resource groups have different precoding. The communication node is a communication node that receives the channels and/or the signals.

According to an embodiment of the present disclosure, the maximum number of data channels that are capable of being received by the communication node is determined according to the signaling information and/or an agreed rule, where an intersection set between time domain resources occupied by multiple data channels is non-empty; and/or the multiple data channels are scheduled by multiple control channels, respectively and the multiple control channels are scrambled by using a C-RNTI.

According to an embodiment of the present disclosure, the functions of the preceding modules may, without limitation, be implemented by a processor or a controller in the communication node device.

Figure 23:
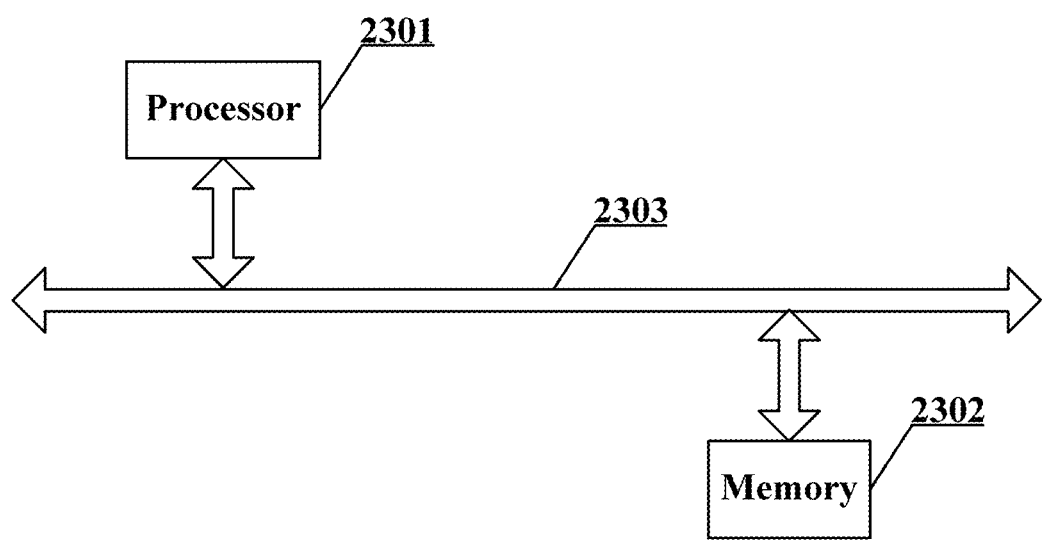
FIG. 23 is a structure diagram of a communication node device according to an embodiment of the present disclosure.

An embodiment of the present disclosure further provides a communication node device. As shown in FIG. 23, the communication node device may include a processor 2301, a memory 2302, and a communication bus 2303.

The communication bus 2303 may be configured to implement a communication connection between the processor 2301 and the memory 2302. The processor 2301 may be configured to execute one or more first computer programs stored in the memory 2302 to perform steps of the control channel monitoring method according to the embodiment of the present disclosure.

According to an embodiment of the present disclosure, the processor 2301 may be further configured to execute one or more second computer programs stored in the memory 2302 to perform steps of the information element transmission method according to the embodiment of the present disclosure.

An embodiment of the present disclosure further provides a computer-readable storage medium. The computer-readable storage medium includes a volatile or nonvolatile medium or a removable or non-removable medium implemented in any method or technology for storing information (such as computer-readable instructions, data structures, computer program modules, or other data). The computer-readable storage medium includes, but is not limited to, a random-access memory (RAM), a read-only memory (ROM), an electrically erasable programmable read-only memory (EEPROM), a flash memory or other memory technologies, a compact disc read-only memory (CD-ROM), a digital versatile disc (DVD) or other optical disc storage, a magnetic cassette, a magnetic tape, a magnetic disk or other magnetic storage apparatuses, or any other medium that can be used for storing desired information and that can be accessed by a computer.

According to an embodiment of the present disclosure, the computer-readable storage medium in this embodiment may store one or more first computer programs. The one or more first computer programs are executable by one or more processors to implement steps of the control channel monitoring method according to the embodiment of the present disclosure.

In another example, the computer-readable storage medium in this embodiment may store one or more second computer programs. The one or more second computer programs are executable by one or more processors to implement steps of the information element transmission method according to the embodiment of the present disclosure.

This embodiment further provides a computer program (or computer software). The computer program may be distributed on a computer-readable medium and executed by a computing apparatus to implement at least one step of the information element transmission method or the control channel monitoring method according to the preceding embodiments. Moreover, in some cases, the at least one step illustrated or described may be performed in sequences different from the sequences described in the preceding embodiments.

This embodiment further provides a computer program product. The computer program product includes a computer-readable apparatus. The preceding computer program is stored on the computer-readable apparatus. The computer-readable apparatus in this embodiment may include the preceding computer-readable storage medium.

It can be seen that it is to be understood by those skilled in the art that some or all steps of the preceding method and function modules/units in the preceding system or apparatus may be implemented as software (which may be implemented by computer program codes executable by a computing apparatus), firmware, hardware, and suitable combinations thereof. In the hardware implementation, the division of the preceding function modules/units may not correspond to the division of physical components. For example, one physical component may have multiple functions, or one function or step may be performed jointly by several physical components. Some or all physical components may be implemented as software executed by a processor such as a central processing unit, a digital signal processor, or a microprocessor, may be implemented as hardware, or may be implemented as integrated circuits such as application-specific integrated circuits.

Additionally, as is known to those having ordinary skill in the art, communication media generally include computer-readable instructions, data structures, computer program modules, or other data in carriers or in modulated data signals transported in other transport mechanisms and may include any information delivery medium. Therefore, the present disclosure is not limited to any particular combination of hardware and software.

The above is a more detailed description of embodiments of the present disclosure in conjunction with implementations and is not to be construed as limiting embodiments of the present disclosure. For those having ordinary skill in the art to which the present disclosure pertains, simple deductions or substitutions may be made without departing from the concept of the present disclosure and are considered to fall within the scope of the present disclosure.

What is claimed is:

1. An information element transmission method, comprising:
    associating one information element with N sets of values of a parameter of a type, wherein N is a positive integer greater than or equal to 1; and
    transmitting or receiving the one information element according to the parameter of the type;
    wherein the one information element is at least one of: one channel, or one signal port;
    wherein the one information element comprises B1 quasi co-location resource groups in frequency domain, wherein a quasi co-location resource group comprises:
        a boundary that coincides with a boundary of a precoding resource group, wherein the boundary comprises a frequency domain boundary;
        a resource in one precoding resource group that does not belong to more than one quasi co-location resource group;
    wherein the B1 quasi co-location resource groups are associated with B1 quasi co-location reference signal sets, and each of the B1 quasi co-location resource groups is associated with one of the B1 quasi co-location reference signal sets; and
    wherein each of the B1 quasi co-location resource groups comprises k precoding resource groups, and k is a positive integer greater than or equal to 1;
    wherein B1 is an integer greater than 1.

2. The method of claim 1, wherein the N sets of values satisfy at least one of the following characteristics:

the N sets of values correspond to M repeated transmissions of the information element; or the N sets of values correspond to one redundancy version pattern bitmap of the information element, wherein the redundancy version pattern bitmap comprises M redundancy version elements;

wherein M satisfies one of the following characteristics: M is a positive integer greater than or equal to 2; M=x*N, wherein x is a positive integer greater than or equal to 1 and x repeated transmissions of the information element correspond to one set of values among the N sets of values; or N=x1*M, wherein x1 is a positive integer greater than or equal to 1 and one transmission of the information element corresponds to x1 sets of values among the N sets of values.

3. The method of claim 1, wherein the parameter of the type comprises at least one of: a phase tracking reference signal, or transmission configuration information (TCI); wherein different parameters among the parameter of the type correspond to a same value or different values of N.

4. The method of claim 1, wherein the one information element comprises one demodulation reference signal port which is associated with the N sets of values of the parameter of the type, and the parameter of the type comprises at least one of: a quasi co-location parameter set, a phase tracking reference signal, or a redundancy version; wherein different parameters among the parameter of the type correspond to a same value or different values of N.

5. The method of claim 1, wherein one data channel is scheduled by N control channels, and each of the N control channels comprises information about a transmission parameter of the one data channel.

6. The method of claim 1, wherein

M repeated transmissions of the information element are associated with N sets of values of transmission parameters, wherein a predetermined transmission parameter of the transmission parameters uses one set of the N sets of values for the M repeated transmissions; or M repeated transmissions of the information element are associated with N sets of values of transmission parameters, wherein in response to satisfying a predetermined condition, a predetermined transmission parameter of the transmission parameters uses one set of the N sets of values for the M repeated transmissions.

7. The method of claim 1, wherein associating the information element with the N sets of values of the parameter of the type comprises that the parameter of the type of the information element has N sets of activated values; and/or associating N sets of activated values of the parameter of the type for one CORESET, wherein the one channel comprises the one CORESET.

8. The method of claim 1, comprising at least one of the following:

determining a value of N or a maximum value of N according to signaling information;

determining the value of N or the maximum value of N according to a value of a parameter among the parameter of the type.

9. The method of claim 1, wherein second information of the one information element is associated with at least one of B1 or k;

wherein the second information comprises at least one of: a number R of repeated transmissions of the one information element, information about a demodulation reference signal of the one information element, or information about a quasi co-location reference signal of the one information element; and wherein R satisfies the following characteristic: R is an integer multiple of B1.

10. The method of claim 9, comprising: acquiring B1, k, and a division of the quasi co-location resource groups according to signaling information or a preset rule.

11. The method of claim 1, wherein the quasi co-location resource group satisfies at least one of the following characteristics:

one demodulation reference signal port corresponds to one quasi co-location reference signal set in each quasi co-location resource group;

one demodulation reference signal port does not satisfy a quasi co-location relationship with respect to one type of quasi co-location parameters in different quasi co-location resource groups;

an intersection set between resources occupied by different quasi co-location resource groups is empty;

wherein the one information element comprises the one demodulation reference signal port.

12. The method of claim 1, further comprising:

configurating a corresponding sequence parameter in a TCI state; or establishing an association between a TCI state and a sequence parameter.

13. The method of claim 1, wherein the precoding resource group includes a channel or a signal with same precoding.

14. An information element transmission apparatus, comprising: a processor and a memory, wherein the memory is configured to store at least one computer-readable program, and the processor is configured to execute the at least one computer-readable program to perform the following steps:

associating one information element with N sets of values of parameter of a type, wherein N is a positive integer greater than or equal to 1; and transmitting or receiving the one information element according to the parameter of the type;

wherein the one information element is at least one of one channel, or one signal port;

wherein the one information element comprises B1 quasi co-location resource groups in frequency domain, wherein a quasi co-location resource group comprises:

a boundary that coincides with a boundary of a precoding resource group, wherein the boundary comprises a frequency domain boundary;

a resource in one precoding resource group that does not belong to more than one quasi co-location resource group;

wherein the B1 quasi co-location resource groups are associated with B1 quasi co-location reference signal sets, and each of the B1 quasi co-location resource groups is associated with one of the B1 quasi co-location reference signal sets; and wherein each of the B1 quasi co-location resource groups comprises k precoding resource groups, and k is a positive integer greater than or equal to 1;

wherein B1 is an integer greater than 1.

15. The apparatus of claim 14, wherein the N sets of values satisfy at least one of the following characteristics:

the N sets of values correspond to M repeated transmissions of the information element; or the N sets of values correspond to one redundancy version pattern bitmap of the information element, wherein the redundancy version pattern bitmap comprises M redundancy version elements;

wherein M satisfies one of the following characteristics: M is a positive integer greater than or equal to 2; wherein x is a positive integer greater than or equal to 1 and x repeated transmissions of the information element correspond to one set of values among the N sets of values; or N=x1*M, wherein x1 is a positive integer greater than or equal to 1 and one transmission of the information element corresponds to x1 sets of values among the N sets of values.

16. The apparatus of claim 14, wherein the one information element comprises one demodulation reference signal port which is associated with the N sets of values of the parameter of the type, and the parameter of the type comprises at least one of a quasi co-location parameter set, a phase tracking reference signal, or a redundancy version; wherein different parameters among the parameter of the type correspond to a same value or different values of N.

17. The apparatus of claim 14, wherein
M repeated transmissions of the information element are associated with N sets of values of transmission parameters, wherein a predetermined transmission parameter of the transmission parameters uses one set of the N sets of values for the M repeated transmissions; or
M repeated transmissions of the information element are associated with N sets of values of transmission parameters, wherein in response to satisfying a predetermined condition, a predetermined transmission parameter of the transmission parameters uses one set of the N sets of values for the M repeated transmissions.

18. The apparatus of claim 14, wherein one data channel is scheduled by N control channels, and each of the N control channels comprises information about a transmission parameter of the one data channel.

19. The apparatus of claim 14, wherein second information of the one information element is associated with at least one of B1 or k;
wherein the second information comprises at least one of: a number R of repeated transmissions of the one information element, information about a demodulation reference signal of the one information element, or information about a quasi co-location reference signal of the one information element; and
wherein R satisfies the following characteristic: R is an integer multiple of B 1.

20. The apparatus of claim 14, wherein the processor is configured to execute the at least one computer-readable program to perform the following steps:
configurating a corresponding sequence parameter in a TCI state; or
establishing an association between a TCI state and a sequence parameter.

21. The apparatus of claim 14, wherein the precoding resource group includes a channel or a signal with same precoding.

* * * * *